(12) United States Patent
Johnson

(10) Patent No.: US 6,908,194 B1
(45) Date of Patent: Jun. 21, 2005

(54) EYEGLASSES WITH INTERCHANGEABLE AND ADJUSTABLE HEADBAND

(76) Inventor: Kevin B. Johnson, 321 Sequoia Rd., Boulder Creek, CA (US) 95006

(*) Notice: Subject to any disclaimer, the term of this patent is extended or adjusted under 35 U.S.C. 154(b) by 0 days.

(21) Appl. No.: 10/140,488

(22) Filed: May 9, 2002

Related U.S. Application Data

(63) Continuation-in-part of application No. 09/665,393, filed on Sep. 20, 2000, now abandoned.

(51) Int. Cl.$^7$ ................................................ G02C 3/00
(52) U.S. Cl. .................... 351/156; 351/157; 351/140
(58) Field of Search ......................... 351/156, 157, 351/158, 153, 140, 121, 41; 2/452; 16/228

(56) References Cited

U.S. PATENT DOCUMENTS

| | | | |
|---|---|---|---|
| 1,819,738 A | * | 8/1931 | Daniels ...................... 351/156 |
| 2,660,092 A | | 11/1953 | Bloom |
| 4,133,604 A | | 1/1979 | Fuller |
| 4,541,696 A | | 9/1985 | Winger et al. |
| 4,696,556 A | | 9/1987 | Perry, III |
| 4,818,094 A | * | 4/1989 | Lyons ........................ 351/157 |
| 4,881,803 A | | 11/1989 | Giles et al. |
| 4,930,885 A | | 6/1990 | Laschober |
| 4,953,967 A | | 9/1990 | Somerville |
| 5,151,778 A | | 9/1992 | Conley |
| 5,157,425 A | | 10/1992 | Liu |
| 5,369,452 A | | 11/1994 | Williams |
| 5,386,254 A | | 1/1995 | Kahaney |
| 5,511,251 A | | 4/1996 | Brakas |
| 5,528,800 A | | 6/1996 | Kliot |
| 5,541,676 A | | 7/1996 | Pallat |
| 5,575,042 A | | 11/1996 | Kalbach |
| 6,024,446 A | | 2/2000 | Hall et al. |
| 6,062,690 A | | 5/2000 | Kliot |
| 6,149,268 A | | 11/2000 | Hall et al. |

* cited by examiner

*Primary Examiner*—Hung Xuan Dang

(57) ABSTRACT

An eyeglasses system comprises an eyeglasses frame having a pair of opposite temple regions an attachment interface at each temple region, and two or more sets of laces. The lace sets are interchangeably attachable and detachable from the attachment interfaces at the temple regions of the frame, such that laces of different styles may be used with the single frame. There are in some systems plural frames each having a pair of opposite temple regions with an attachment interface at each temple region, such that plural sets of laces may be freely interchanged and worn with plural sets of laces. Individual ones of the lace sets may include laces of one or more of different styles, colors, indicia, widths, or materials.

9 Claims, 28 Drawing Sheets

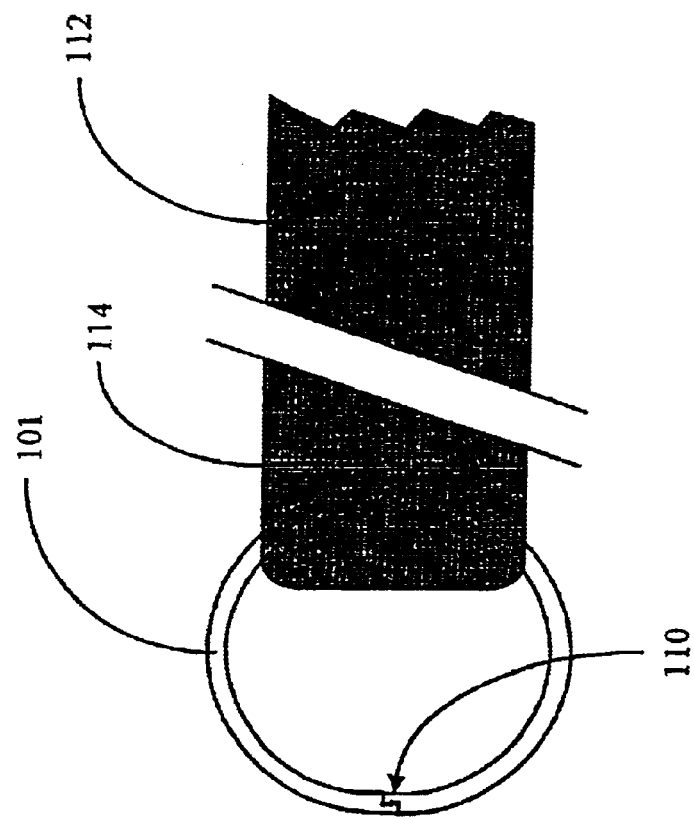
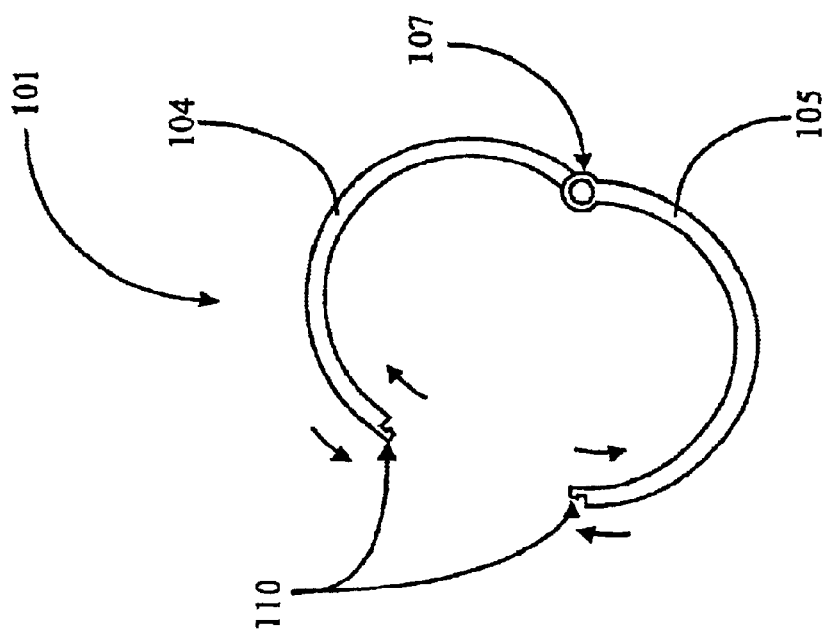
Fig. 1b
Fig. 1a

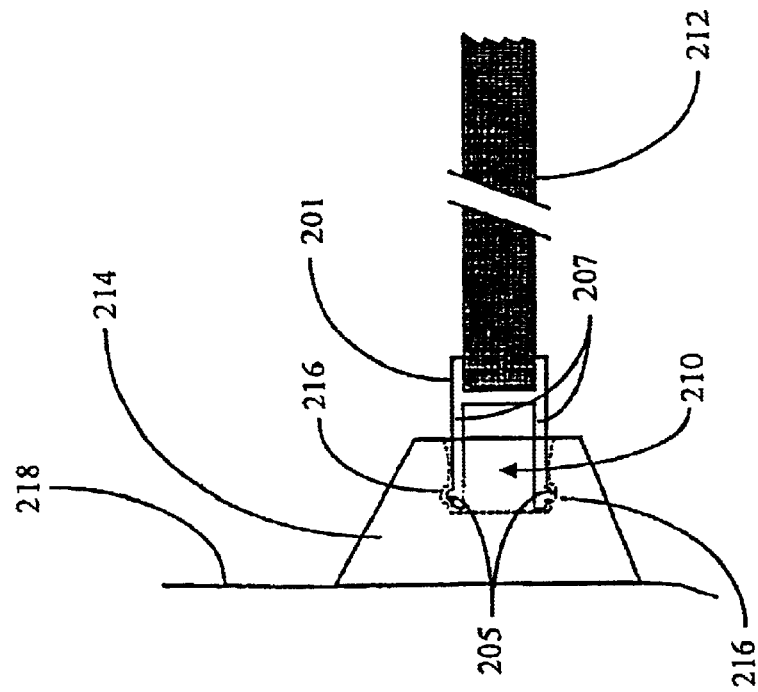
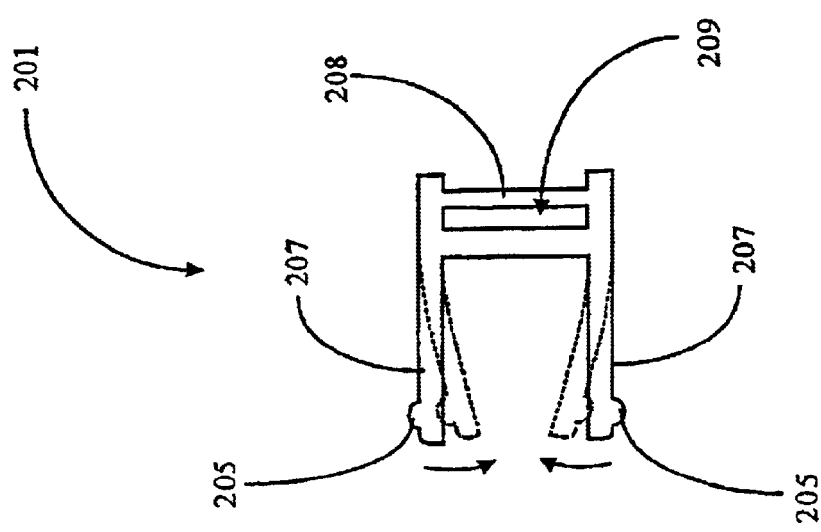
Fig. 2b
Fig. 2a

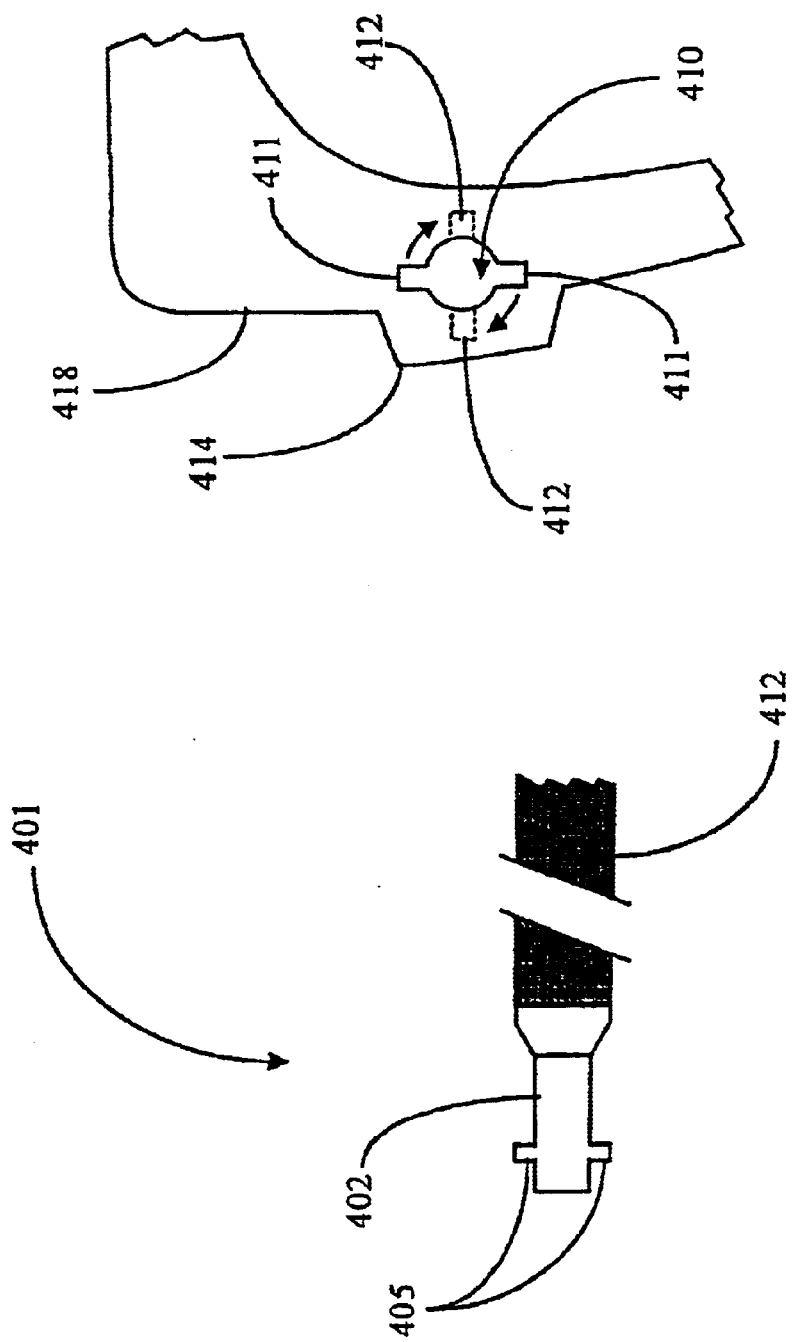

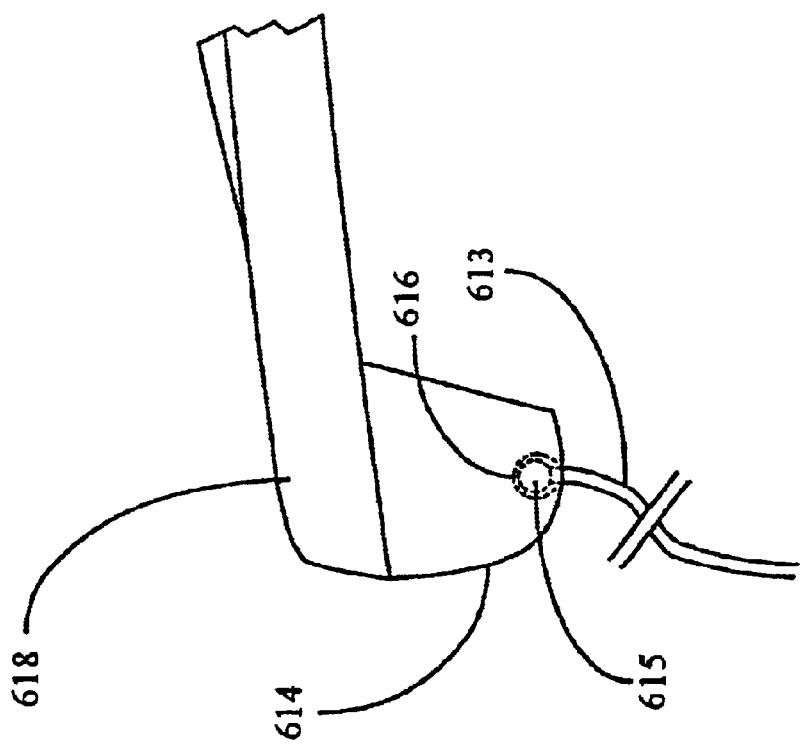

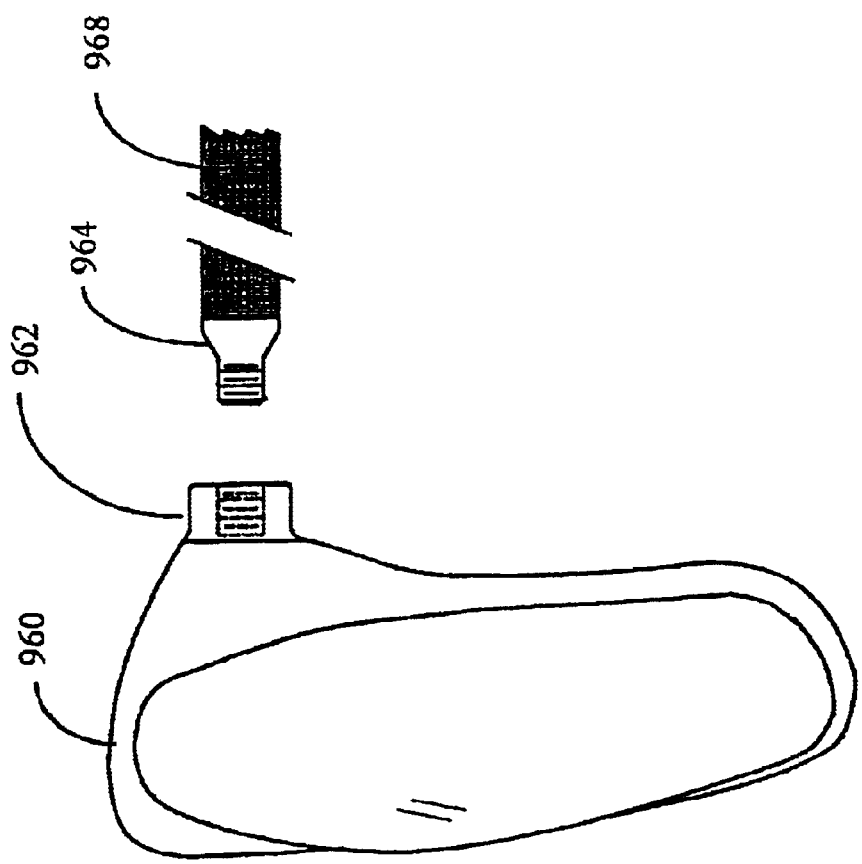

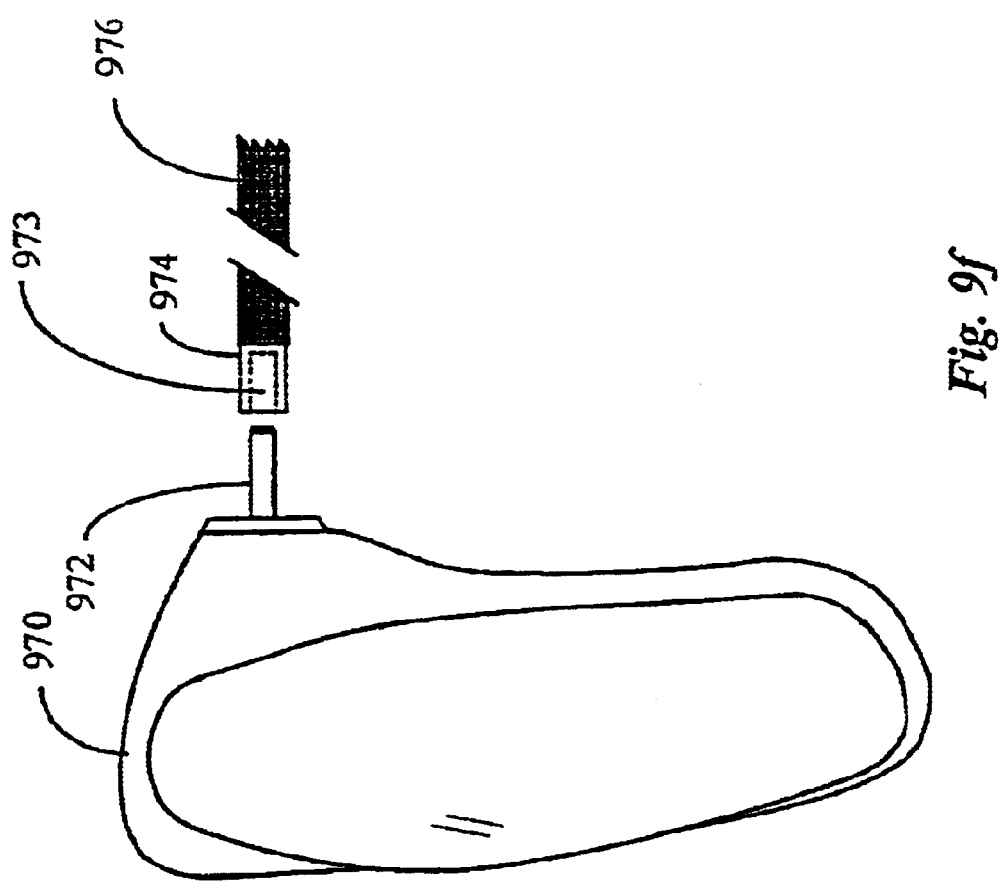

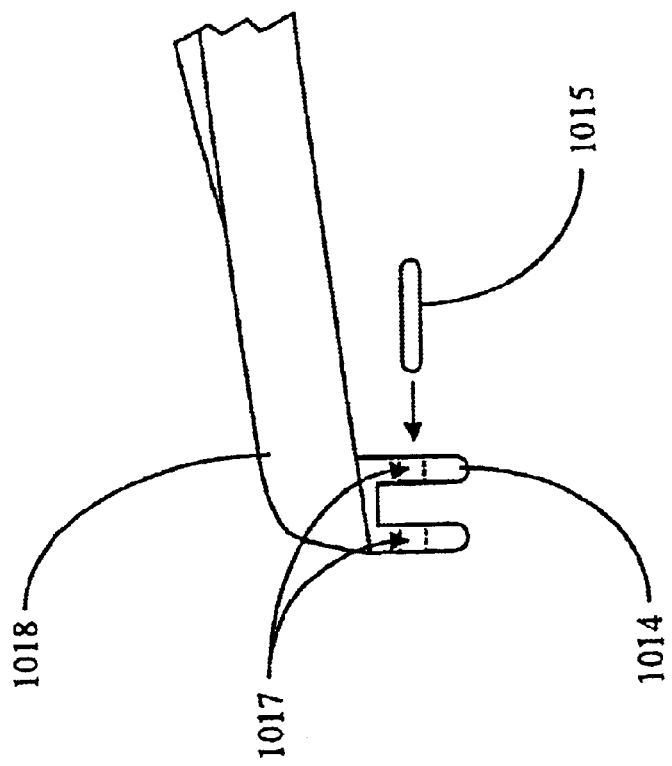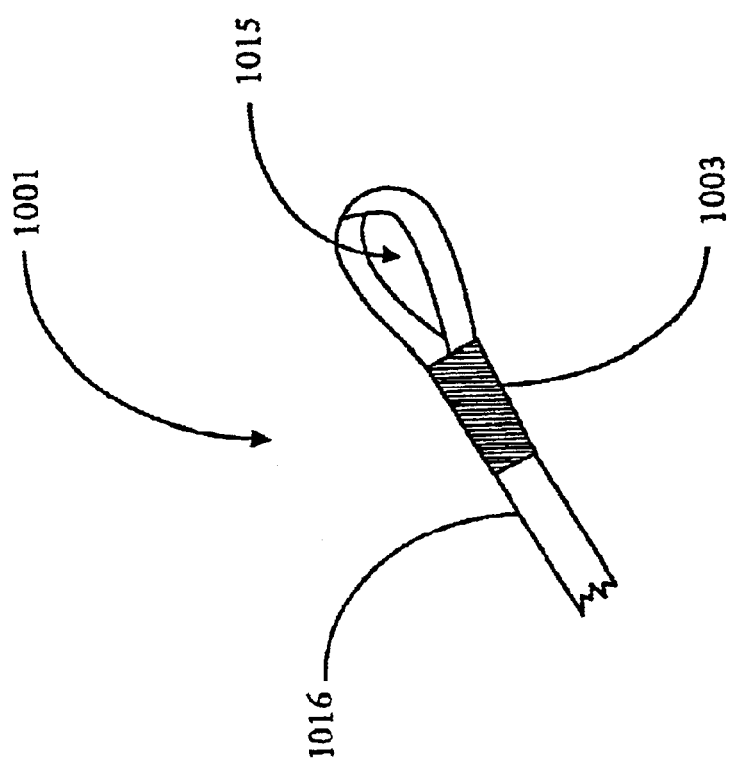
Fig. 10b
Fig. 10a

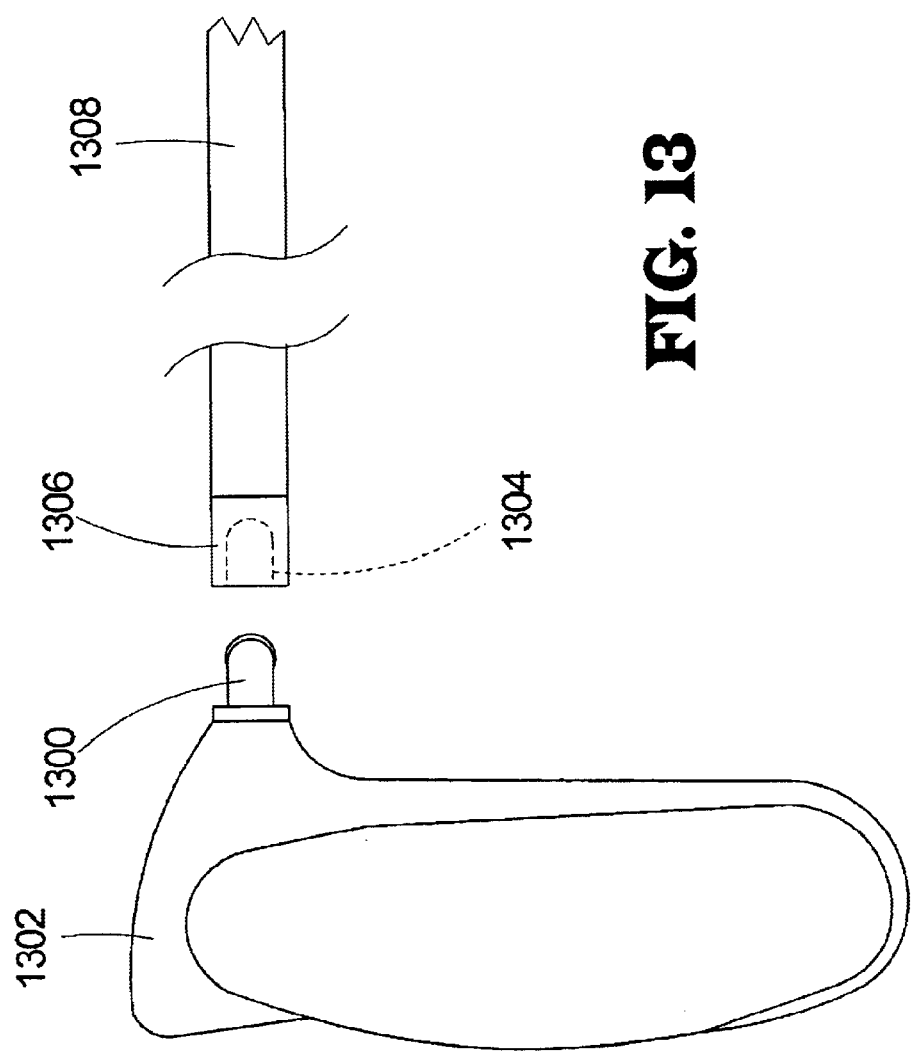

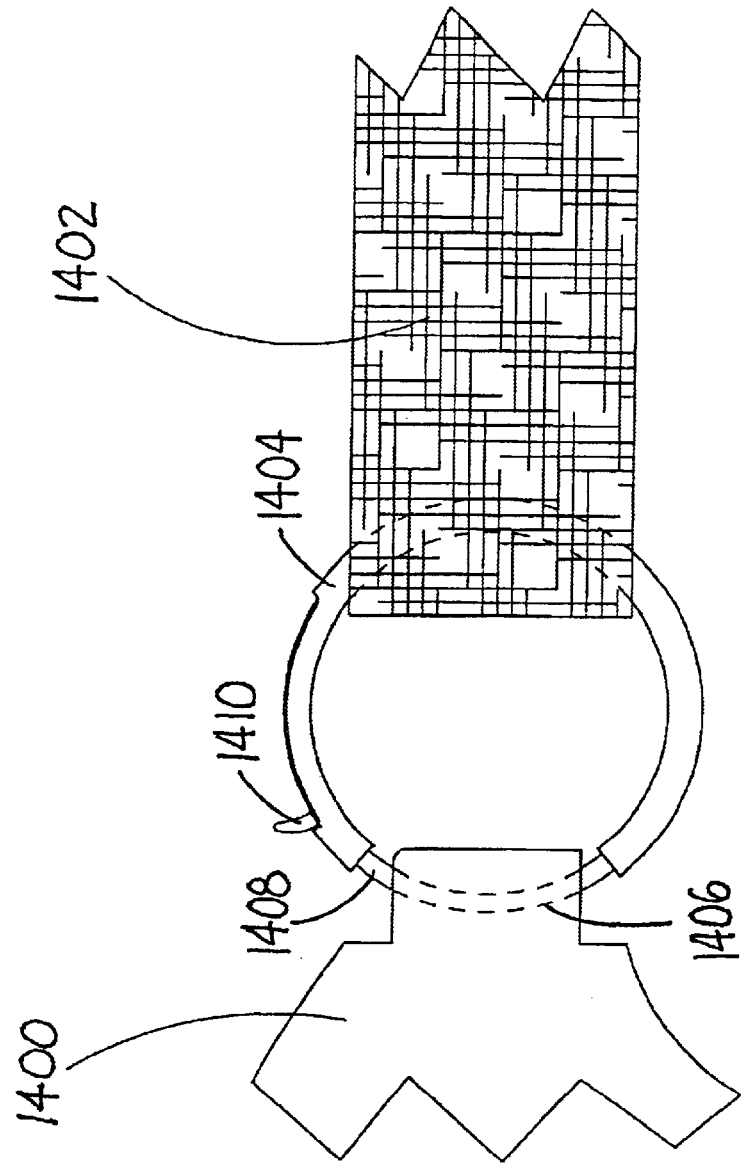

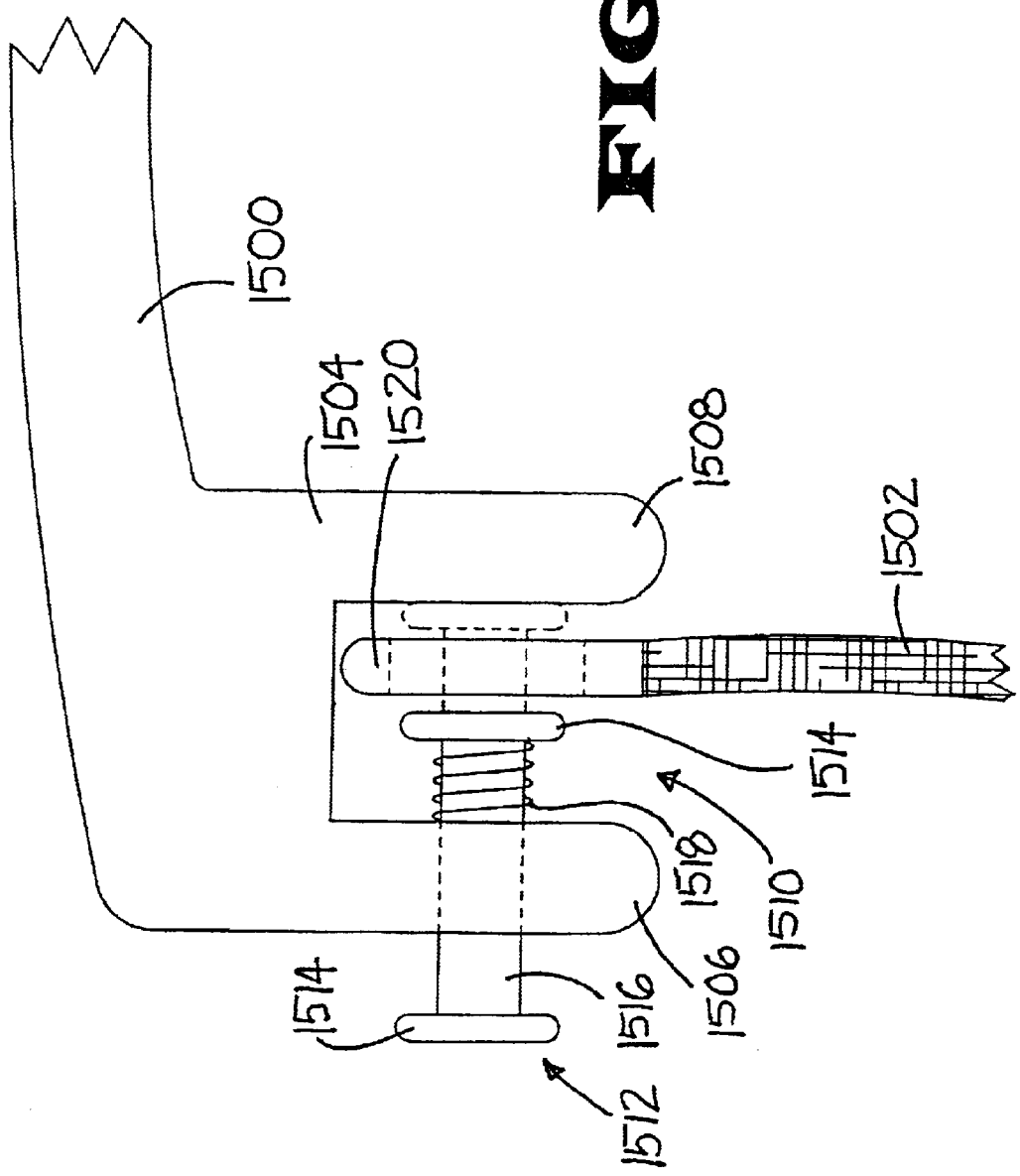

EYEGLASSES WITH INTERCHANGEABLE AND ADJUSTABLE HEADBAND

REFERENCE TO RELATED APPLICATION

This application is a continuation-in-part of application Ser. No. 09/665,393, filed Sep. 20, 2000, abandoned.

BACKGROUND OF THE INVENTION

1. Field of the Invention

The present invention is in the field of eyeglasses, and has particular application in providing an improved method and apparatus for securing eyeglasses in the desired position while being worn.

2. Background of the Invention

The present invention is related to and improves upon an existing U.S. Pat. No. 5,956,118 issued to the present inventor on Sep. 21, 1999.

Eyeglasses, also commonly known as spectacles or glasses, comprise an instrument or device including lenses or prisms mounted in a plastic or metal frame to hold them in position in front of the eyes, for the purpose of aiding vision or compensating for various visual defects such as myopia or astigmatism for example. In addition to correcting visual defects, eyeglasses are also commonly worn to protect the user's eyes from harm caused by environmental or workplace hazards. For example, eyeglasses consisting of lenses of various shades or colors, and often manufactured with a protective ultraviolet coating, are used to protect the eyes from the harmful rays of the sun, or from the glare of very bright lights. In another example, in order to protect the eyes from the actinic rays of welding flames, workers wear eyeglasses having lenses of a much deeper tint. In still other examples, machinists and other factory workers wear eyeglasses or goggles having lenses of great strength to shield their eyes from flying particles of metal or some other hazardous material, and aviators and racing drivers wear protective goggles to shield their eyes from the wind and other airborne particles. Protective eyeglasses are also commonly worn in many court sports as racquetball and basketball, or other sports where equipment used or close proximity between participants causes a potential hazard to the eyes.

The most common form of eyeglasses consists of a pair of glass or plastic lenses mounted within a metal or plastic frame resting the bridge of the nose that is and usually supported by a pair of nose pads for a nose piece shaped to provide a comfortable fit. A common frame for eyeglasses consists of bows, or arms, extending to the rear of the frame from end pieces or temples on each opposite side of the frame end. The bows are usually hinged and sometimes permanently attached at temple areas of the frame. A common eyeglasses frame is held in place on the user's head by inward spring pressure applied to the arms causing them to grip the head from the sides, or by curved ends of the arms that hook around behind the user's ears. A combination of spring-loaded arms and hooked ends is often utilized.

Another less common form of eyeglasses, known as pinch nose glasses. have frames that are held in place by pressure on the bridge of the nose, such as by a nosepiece utilizing spring pressure or some form of resilient material. Single lenses, known in the art has monocles, are used to correct the sight of just one eye and are held in place by wedging the lens in the orbit of the eye. Eyeglasses with a handle attached to the frame, rather than utilizing spring-loaded arms (for example), is occasionally employed for reading, and are commonly referred to as lorgnettes.

As previously mentioned many attempts have been made over the many years since the development of eyeglasses to hold the frame of the eyeglasses in place while worn so that the lenses mounted within the frame rest in their proper position in front of the eyes without undue movement. It is especially important for wearers of eyeglasses with corrective lenses to maintain the proper distance between the lens and the surface of the eye so as to best utilize the corrective properties of the lenses. For example, if corrective eyeglasses worn by a user according to conventional art are moved or bumped into an uneven position in front of the eyes, optimal vision correction is lost and the view through the lens can become distorted.

A common problem encountered by users wearing conventional eyeglasses is a tendency for the frame to slide downward on the bridge of the nose due to a combination of the forces of gravity and the movement of by the user. This problem is exacerbated when the user perspires and the skin surface of the user's nose becomes slippery, thus increasing the tendency for the eyeglasses to slide downwardly and outwardly from the face. The holding effectiveness of temple arms with ends that hook around the ears is also diminished by perspiration occurring behind the ear which causes the surface of the skin behind the ear to become increasingly slippery as well, causing the hooked ends to lose their grip. The problem is further exacerbated when external forces are applied to eyeglasses worn by an active user such as an athlete performing strenuous sports including running or riding a bike down a bumpy trail.

The formed nosepiece or nose pads, used in conjunction with temple arms having ends that hook around the ears, which are the structures commonly used in conventional eyeglasses, often does not adequately provide the fit and support many users desire. The shape, width and slope of the bridge of the nose can vary greatly from different users, as can the circumference of the head and distance between the ears and bridge of the nose. Because of these physical disparities between users no single combination of temple arms and nosepiece or nose pads provides optimal fit, hold and support for most users. Eyeglasses frames must often be adjusted in many ways for different users in order to obtain the desired secure and comfortable fit. For example, a user having a nose bridge thinner than average must adjust the pair of nose pads of the eyeglasses, if so equipped, inward to diminish the space between each other. The opposite is true for a user with a nose bridge wider than is average, necessitating an outward adjustment of the nose pads to obtain the proper fit. As previously mentioned, the circumference of the user's head and the distance between the bridge of the nose and the ears varies greatly between users and necessitating and additional adjustment of the hooked ends of, if so equipped, and the amount of space between the temple arms. Many modern eyeglasses are furnished with temple arms having a straighter end with a sometimes ergonomically shaped cover. usually made of a textured rubberized material, instead of a hooked end that partially wraps around behind the ear as in more conventional art. Such a temple arm end covering is viewed by many to be trendy and fashionable, but can provide the necessary anchoring of the temple arms only in dry and optimal conditions. As is the case with temple arms having ends that wrap around the ear such straighter, rubber-covered temple arms are also very susceptible to slippage due to perspiration behind the ears or being subjected to otherwise wet conditions in the environment such as rain, snow or the like.

Attempts have been made to integrate structures, such as headbands, into the structure of the eyeglasses for creating a more effective and secure mounting of the eyeglasses to the head of the user. One illustrative example of such known structures is taught in U.S. Pat. No. 4,930,985 to Laschober. The Laschober patent teaches two different attachment members or structures for attaching a headband to the frame. One structure, shown in FIGS. 1 through 4 of the Laschober patent, includes an attachment member mounted on the headband with an arm and tab adapted for engaging an aperture formed in a connector member mounted on the frame. A significant drawback for this structure of the Laschober patent is that the user must press the tab on the arm inward (through the aperture) to disengage the tab from the aperture and release the attachment member from the connector member. Thus, the user cannot simply disengage the attachment member from the connector member of Laschober, but the user must attempt to press the relatively small tab, a task that does not appear to capable of being performed while the Laschober apparatus is on the head of the user so that the user could release the headband from the frame while the Laschober device is being worn on the user's head. Instead, it appears that the Laschober device would have to be removed from the user's head first, and then the attachment member could be released from the connector member. This required step makes it highly likely that the user would mess up his or her hair upon removing the Laschober headband from the user's head because the user is unable to release the tension of the headband from the frame prior to removing the device from the user's head.

Another structure of U.S. Pat. No. 4,930,885 to Laschober, shown in FIGS. 5 through 7 thereof, employs an attachment member comprising a wire forming a closed shape with break in the wire. One variation has a threaded nut which selectively bridges the break in the wire, but the other variation has overlapping halves that must be forced apart to remove the loop of the band from the wire. Again, the forcible separation of the overlapping ends of the wire appears to be difficult, if not impossible, to perform while the Laschober device is being worn by the user, and again it appears that the Laschober device would have to be removed from the user's head before the headband could be released from the frame.

What is clearly needed is an improved method and apparatus for holding the frames of eyeglasses in the proper position in front of the eyes, enabling the average user to more easily maintain the lenses of the eyeglasses at the proper distance and alignment with the eyes. Such a method and apparatus will provide the user with the desired fit and hold regardless of the amount of activity, perspiration or environmental conditions. Variations of such method and apparatus will also allow the average user interchangeability of securing components while offering a broad choice between different fashionable colors sizes and styles of straps (laces) and buckles.

SUMMARY OF THE INVENTION

In view of the foregoing disadvantages inherent in the known types of eyeglasses now present in the prior art, the present invention provides a new apparatus for securing eyeglasses to the head of a wearer construction wherein the same can be utilized for securing eyeglasses on the head of the wearer of the glasses.

To attain this, the present invention generally comprises an eyeglasses frame having a pair of opposite temple regions, a lace structure having opposite ends, and coupling means for removably coupling each of the opposite ends of the lace structure to one of the temple regions of the eyeglasses frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such. those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Generally, in many of the most preferred embodiments, the present invention advantageously permits and facilitates removal of the lace structure from the eyeglass frame without requiring removal of the frame and lace structure from the head of the user, and in some embodiments permits one-handed removal of the lace structure of at least one end of the lace structure from the eyeglass frame.

In greater detail, in at least one embodiment of the present invention, the eyeglasses system comprises an eyeglasses frame having a pair of opposite temple regions and an attachment interface at each temple region, and one or more sets of laces. The lace sets may be interchangeably attachable and detachable from the attachment interfaces at the temple regions of the frame such that laces of different sizes and styles may be used with the same or different frames.

In one embodiment of the invention, the eyeglasses system further comprises a plurality of frames each having a pair of opposite temple regions with an attachment interface at each temple region such that a plurality of sets of laces may be freely interchanged and worn with the plurality of frames.

In some embodiments of the invention, each attachment interface comprises a temple piece with a hole therethrough. and each lace set comprises rings that may be opened to pass through both the holes in the temple pieces and a loop in the laces. The rings may be of various shapes, including, but not limited to, triangular, oval, or "D" shapes.

In some embodiments of the invention, each attachment interface comprises a temple piece with a slot having upper and lower indentions or rounded protrusions. and each lace set comprises attachment clips with flexible arms, each arm having a rounded protrusion or an indention, such that the arms deflect inward as the clip is inserted in the slot, and the arms deflect outward again as the rounded protrusions or indentions engage the indentions or rounded protrusions in the slot to thereby hold the clips in the slots. The rounded nature of the protrusions allow disengagement of clips from slots by pulling on the laces or clips. In other embodiments, each attachment interface comprises a temple piece with a blade having upper and lower rounded protrusions or indentions, and each lace set comprises attachment clips with flexible arms. Each arm has an indention or a rounded protrusion such that the arms deflect outward as the clip is pushed over the blase, and the arms deflect inward again as the indentions or protrusions engage the rounded protrusions or indentions of the blades to thereby hold the clips on the blades. Again, the rounded nature of the protrusions allows disengagement of clips from blades by pulling on the laces or clips, which can be performed while the frame and lace structure is located on the head of the user, and may be performed in a one-handed operation.

In some embodiments of the invention, each attachment interface comprises a temple piece with a socket, and each lace set comprises attachment clips implemented to engage the sockets securely by push and twist action.

In some preferred embodiments. the sets of laces each have non-adjustable engagement elements at the temple pieces, and each lace set includes separate laces including a separable clip arrangement at the ends opposite the non-adjustable engagement elements. The separable clip arrangement may comprise two joinable pieces, one of which engages a lace in a manner to allow adjustment of the length of the lace. Adjustment of the length of the lace may be provided by hook and loop fastener elements mounted on the lace, or by a slot in one of the joinable pieces allowing a lace to pass therethrough, and a buckle allowing the ends of the lace passed through to be adjustably engaged, as well as by other means. In some cases a friction clamp may be used, and the friction clamp may be spring-loaded.

In some embodiments, the sets of laces each have adjustable engagement elements at the temple pieces, and each lace set includes separate laces including a separable clip arrangement at the ends opposite the adjustable engagement elements. The separable clip arrangement may comprise two joinable pieces. Adjustment in these embodiments may be provided at the temple pieces by laces that pass through a slot in the relevant temple piece and fold back, joined by a buckle or friction element providing length adjustment. In alternative embodiments, the attachment interface may be a male or female thread, and each lace element has a matching threaded element for engaging the thread at the temple pieces.

In some preferred embodiments of the present invention individual ones of the lace sets may include laces of one or more of different styles, colors, indicia, widths, or materials.

It is a particular object of the invention to provide a system wherein glasses frames of many sorts, such as prescription glasses, reading glasses, sunglasses, goggles, and others may be interchanged with many different laces of many different styles, colors, indicia and materials, as well as sizes and widths, to suit a user's mood and inclination at any given time.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1a is an elevation view of a snap ring according to an embodiment of the present invention.

FIG. 1b is an elevation view of the snap ring of FIG. 1a and an eyeglasses securing strap or lace.

FIG. 2a is an elevation view of a strap clip according to another embodiment of present invention.

FIG. 2b is a side view of the clip of FIG. 2a, an eyeglasses strap and an eyeglasses temple piece and frame according to an embodiment of the present invention.

FIG. 4a is an elevation view of an eyeglasses strap with swivel clip according to another embodiment of present invention.

FIG. 4b is a rear broken view of a portion of eyeglasses frame according to embodiment of the present invention.

FIG. 6c is a top broken view of a portion of an eyeglasses frame. temple piece and eyeglasses strap according to another embodiment of the present invention.

FIG. 9e illustrates a temple piece allowing a strap to be attached by a screw thread.

FIG. 9f illustrates another embodiment of a temple piece and engagement element in an embodiment of the invention.

FIG. 10a is a view of an end of an eyeglasses strap according to another embodiment of the present invention.

FIG. 10b is a top broken view of a portion of eyeglasses frame, temple piece and securing pin according to an embodiment of the present invention.

FIG. 13 is a side view of a portion of another embodiment of the invention featuring an enlarged post and socket.

FIG. 14 is a side view of a broken away portion of the eyeglass frame and lace structure of another embodiment of the invention featuring a ring connector with a portion of the ring connector being slidable.

FIG. 15 is a top view of a broken away portion of the eyeglass frame and lace structure of another embodiment of the invention featuring a slidable biased connector rod for engaging a loop formed in the lace structure.

DESCRIPTION OF THE PREFERRED EMBODIMENT

Figure 1D:
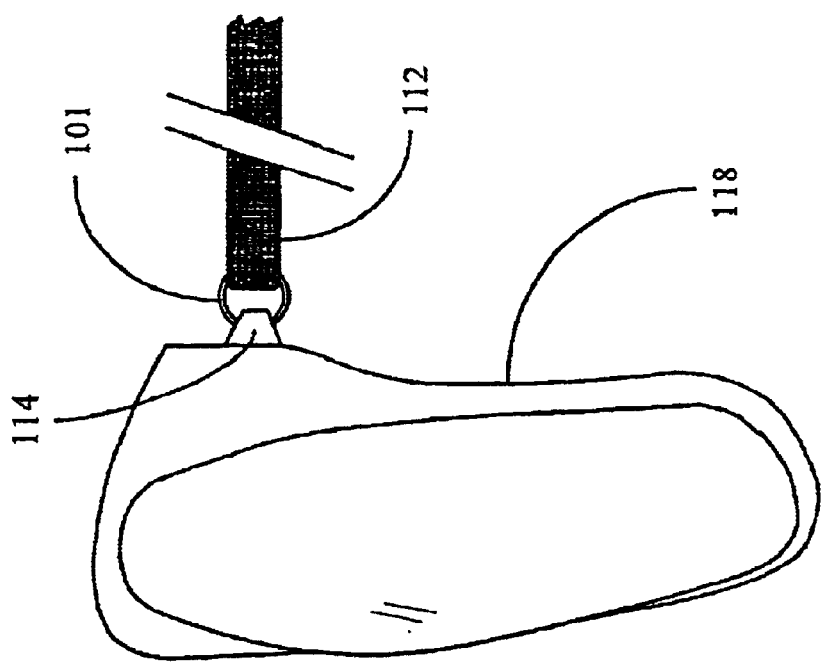
FIG. 1d is a side view of eyeglasses used with the snap ring and securing strap of FIG. 1b according to an embodiment of present invention.

With reference now to the drawings, and in particular to FIGS. 1 through 16 thereof, a new apparatus for securing eyeglasses to the head of a wearer embodying the principles and concepts of the present invention will be described.

It is one object of the present invention to provide an improved method and apparatus for securing eyeglasses on the head of the user such that, among other advantages, a user is permitted to safely and securely wear eyeglasses during extreme physical activity or during adverse conditions such as wind or rain. It is also an object of the present invention to provide the eyeglasses wearer with greater flexibility in choosing difference sizes, colors and styles of the securing apparatus with the ability to easily interchange components (such as the frames) to suit a particular need. Such method and apparatus is described in enabling detail below. A patent on some novel arrangements of eyeglasses and laces was issued to the present inventor on Sep. 21, 1999, and the present disclosure builds upon and improves the methods and apparatus taught in the disclosure of that patent. It should be noted that the terms of "laces" and "straps" and "lace structure" are used interchangeably in this specification. Further, the laces, etc. may be formed of virtually any suitable flexible material, and may include a relatively narrow cord or a relatively wide band.

FIG. 1a is an elevation view of a snap ring according to an embodiment of the present invention. In a preferred embodiment a snap ring 101 is manufactured of strong, resilient metal alloy or other similarly sturdy wire-like material. The snap ring 101 comprises portion 104 and portion 105, both hemi-circular in shape. connected at one end by hinge 107 that allows both portions to open and close in the directions indicated. The opposing ends of each portion each have a notch 110 arranged in opposite configuration or orientation with respect to each other so as to releasably snap together, with the end of one portion being releasably secured to the end of the other portion, when both portions are closed together and the notched ends meet and are pushed together.

FIG. 1b is an elevation view of the snap ring 101 of FIG. 1a and an eyeglasses securing strap 112 of a lace structure. In this view, the strap 112 can be seen extending over the hinged portion of the snap ring 101, which is shown in the closed and locked portion via the conjunction of notches 110. The strap 112 in this embodiment is looped around the hinged portion of the snap ring 101 and is stitched to itself at a seam 114 to thereby attach the strap to the ring 101. The means for attaching the end of strap 112 to the snap ring 101 may vary, and may include means such as bonding with adhesive material, securing by a metal clamp, or securing by using a non-permanent method such as a metal clamp or clip allowing a user to remove the strap 112 from the snap ring 101.

Figure 1C:
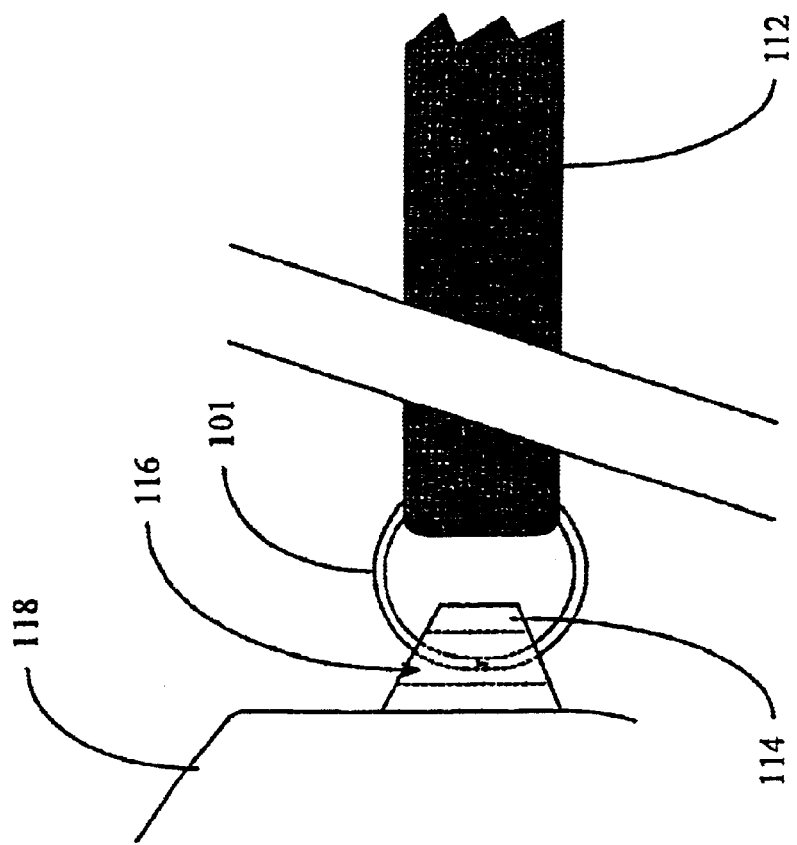
FIG. 1c is an elevation view of the snap ring and securing strap of FIG. 1b and an eyeglasses temple piece according to an embodiment of the present invention.

FIG. 1c is an elevation view of the snap ring 101 and the securing strap 112 of FIG. 1b and an eyeglasses temple piece according to an embodiment of the present invention. The temple piece 114 in this embodiment extends out from an eyeglasses frame 118, and may be molded to the frame 118 or may be attached to the frame using a variety of methods. The frame 118 may be provided with a vertical hole 116 passing completely through the center of the temple piece 114. The purpose of the hole 116 is to accommodate passage of the snap ring 101, with one portion of the open snap ring 101 passed through hole 116 and then snapped closed to thereby secure the securing strap 112 to the eyeglasses frame by means of the temple piece 114.

FIG. 1d is a side view of the eyeglasses frame 118 used with the snap ring 101 and the securing strap 112 of FIG. 1b according to an embodiment of present invention. In this view, the temple piece 114 can be seen in its position extending out from eyeglasses frame 118, with the strap 112 being secured to the temple piece 114 using the attached snap ring 101. In an optional embodiment using a similar strap securing method as is depicted here, the size, shape, and location of the temple piece 114 can vary depending on the style and shape of the eyeglasses frame to which it is attached. Similarly, the size and thickness of the snap ring 101 can vary, as can the manner of snapping or otherwise securing the opposing ends of a snap ring such as the snap ring 101. In another embodiment, a hinged securing ring may be used which has one open end being hollow and the other end being solid with a slightly smaller diameter than that of the hollow end. The smaller, solid end is thus permitted to slip into the hollow end when the ring is closed, similarly to the method utilized in closing a common type of earring.

FIG. 2a is an elevation view of a strap clip 201 according to another embodiment of present invention. The clip 201 is provided as an optional structure for securing an eyeglasses strap to the frame of the eyeglasses. One preferred embodiment of the clip 201 employs a sturdy resilient plastic, or can be manufactured of a resilient metal alloy or similar material. The clip 201 may be substantially rectangular in shape, with a strap post 208 being located at the rear to create a slot 209 through which the end of an eyeglasses strap may pass. Arms 207 extend outward from the slot 209, with each arm having a rounded protrusion 205 located near the end of the arm on the outer surface as shown. The arms 207 are preferably flexible and resilient in nature to allow them to bend inward towards each other in the direction indicated and then snap back to their original position once the external force is removed and the arm is released.

FIG. 2b is a side view of the clip 201 of FIG. 2a, with an eyeglasses strap and an eyeglasses temple piece and frame according to an embodiment of the present invention. The temple piece 214 in this embodiment is somewhat similar in overall shape to the temple piece 114 of FIG. 1c that is attached to the rear of eyeglasses frame 218. The temple piece provides a slot 210 having a height and width similar to that of the clip 201, but slightly larger to allow the clip 201 to slide inward into the slot 210. The opening of the slot 210 is slightly curved outward as shown to allow easier insertion of the clip 201. The slot 210 is provided with rounded notches 216 located at the rear and extending somewhat into the temple piece 214.

The arm 207 may be rounded at the outboard end such that one need not manually depress arms 207 to engage clip 201 in slot 210. It is only necessary to position the clip and push the clip into the slot. The design of the clip arms 207 causes the arms to deflect. When the protrusions 205 reach the position of the notches 216, the deflected arms re-extend to engage the protrusions in the notches. The clip is then secured in the temple piece with sufficient holding power such that the clip, and a connected strap 212, will not disengage from the frame in normal use.

The rounded nature of protrusions 205 and the notches 216 serves another important purpose of facilitating easy disengagement of the clip from the temple piece 214 when the user wishes to make the disengagement for removing the invention from his or her head. This disengagement can be done simply by pulling the clip straight out front the slot. This action will cause the arms to again deflect and the protrusions 205 to disengage from the notches 216 and thus allow disengagement.

The clip 201 can be seen in this view attached to a strap 212, and it can be assumed that the method of attachment utilized here is similar to that utilized for the strap 112 and the snap ring 101 of FIG. 1b. However, as with the strap 112, the manner of attaching the strap 121 to the clip 201 can vary in different embodiments. In a preferred embodiment, the arms 207 flex slightly inward when the clip 201 attached to the strap 212 is inserted into the slot 210, and then the arms snap back into place once fully inserted, with the protrusions 205 neatly fitting into the notches 216 of the temple piece 214 to thus secure the clip 201 to the temple piece 214. Once fully inserted a d snapped into place, a small portion of the arms 207 remains exposed so that a user can easily disengage the clip 201 from the temple piece 214 by pressing down on the exposed portions of the arms 207, bending them slightly inward to thereby release the protrusions 205 from the notches 216 and allowing the clip 201 to slide out of the slot 210.

Figure 3B:
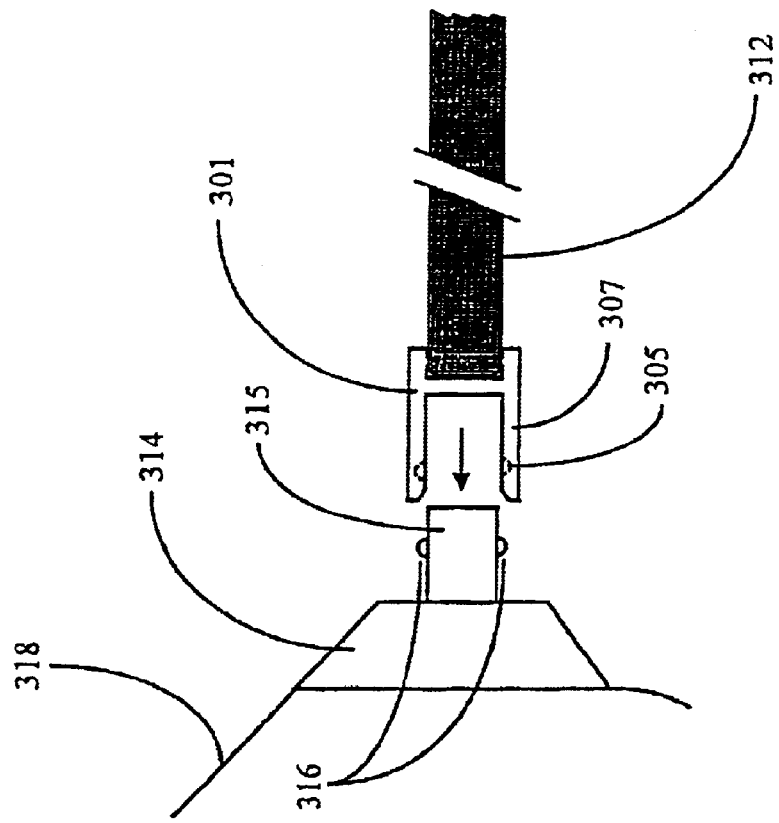
FIG. 3b is a side view of the clip of FIG. 3a, an eyeglasses strap and an eyeglasses temple piece and frame according to an embodiment of the present invention.
Figure 3A:
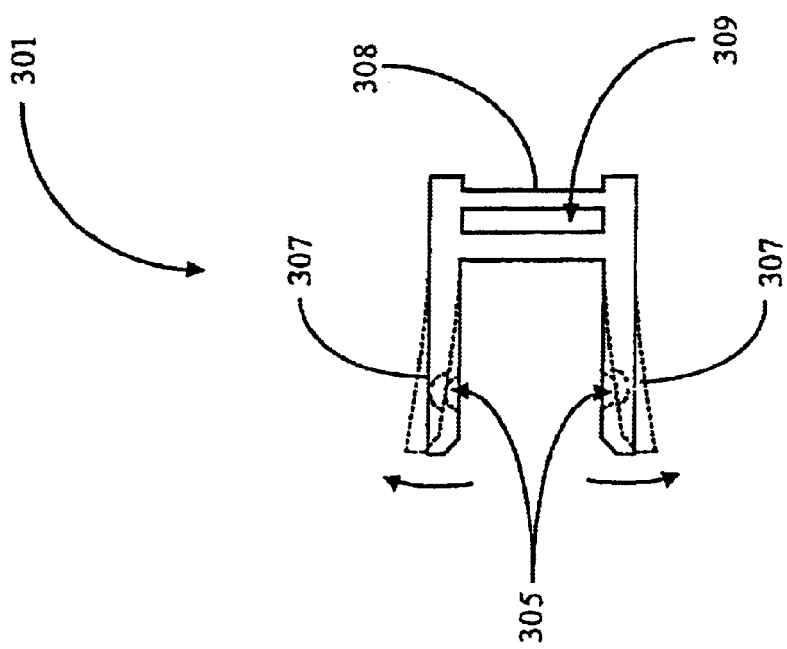
FIG. 3a is an elevation view of a strap clip according to another embodiment of present invention.

FIG. 3a is an elevation view of a strap clip according to another embodiment of the present invention. The clip 301 may be manufactured of similar materials and of similar overall shape and size to the clip 201 of FIG. 2a. The clip 301 has two flexible arms 307 with the ability to be flexed outward in the direction indicated while returning to the original position when released. The clip 301 also has a post 308 creating a slot 309, both also similar to the clip 201 of FIG. 2a. Instead of having protrusions such as those of the clip 201, the clip 301 has rounded notches 305 located on the inner surfaces near the ends of the arms 307, with the notches being rounded on the outboard ends. FIG. 3b is a side view of the clip of FIG. 3a, an eyeglasses strap 312, an eyeglasses temple piece 314, and a frame 318 according to an embodiment of the present inventions. The temple piece 314 in this embodiment is attached to an eyeglasses frame 318 and is somewhat similar to the temple piece 214 of FIG. 2b, but has a peg 315 extending outward from its rear surface. Rounded protrusions 316 are provided in this embodiment that extend out from opposing sides of the peg 315. The clip 301 is attached to the eyeglasses strap 312 by a similar manner to that used for the strap 212 and the clip 201 of FIG. 2b, (but as is the case with previous components, the manner of attachment, either permanent or non-permanent, can vary in the embodiments). To attach the strap 312 to the temple piece 314, the clip 301 is slid over the peg 315 until the ends of the arms 307 make contact with the protrusions 316 of the peg 315. Once contact is made, further pushing of the clip 301 causes the arms 307 to slide over the protrusions 316, bending slightly outward until they finally snap back into place once the rounded notches 305 are completely over protrusions 316 to thereby secure the clip 301 to the peg 315 of the temple piece 314. The rounded nature of the elements as described above also allows easy disengagement of the clip 301 from the temple piece 314. The user thus only needs to pull on the clip with sufficient force to cause the clip arms to deflect to get the clip to disengage from the temple piece.

FIG. 4a is an elevation view of an eyeglasses strap with a swivel clip according to another embodiment of present invention. The swivel clip 401 is provided as another alternative for securing an eyeglasses strap to an eyeglasses frame. The clip 401 in this embodiment is permanently attached to an eyeglasses strap 412 using a variety of methods (such as bonding or gluing) and has a peg 402 with protrusions 405 extending out from opposite sides near the end.

FIG. 4b is a rear broken view of a portion of an eyeglasses frame according to one embodiment of the present invention. Eyeglasses frame 418 is provided with a temple piece 414 that accommodates a hole 410, with the hole 410 extending in this embodiment approximately half the distance into the frame 418, and designed to allow for the insertion of the clip 401. The hole 410 has notches 411 located at opposing ends at the surface of the hole 410, and are shaped similarly to the protrusions 405 of the clip 401. Notches 412, located deeper within the hole 410 as seen here in a hidden view. are located in positions opposite to each other as with the notches 411, but are rotated 90 degrees. To attach the strap 412 to the frame 418, the clip 401 is inserted into the hole 410 with the protrusions 405 of the clip 401 being aligned with the notches 411 of the hole 410. Once fully inserted into the hole 410, the clip 401 is rotated 90 degrees thereby locking the protrusions 405 into the notches 412. Detachment of the components is achieved by rotating the inserted clip 401 approximately 90 degrees in a direction opposite to that which was used in insertion, thereby unlocking the protrusions 405 from the notches 412, aligning them with the notches 411. and allowing the complete withdrawal of the clip 401 from the temple piece 414.

Figure 4C:
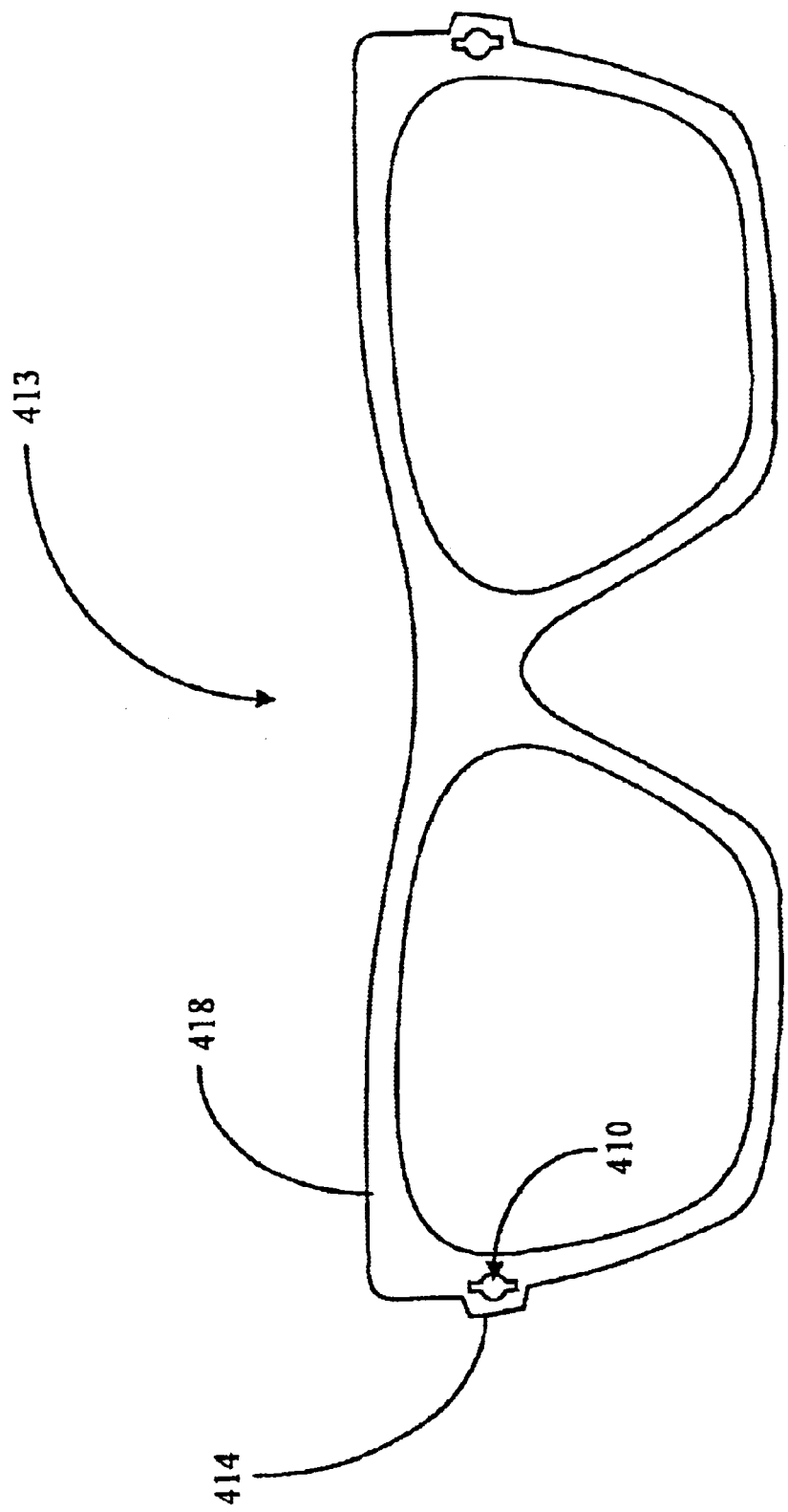
FIG. 4c is a rear view of the eyeglasses frame of FIG. 4b.

FIG. 4c is a rear view of the eyeglasses frame of FIG. 4b. In this view, the eyeglasses frame 418 can be seen in its entirety with a temple piece 414 at each end with the holes 410 extending into each end of the temple piece.

Figure 5B:
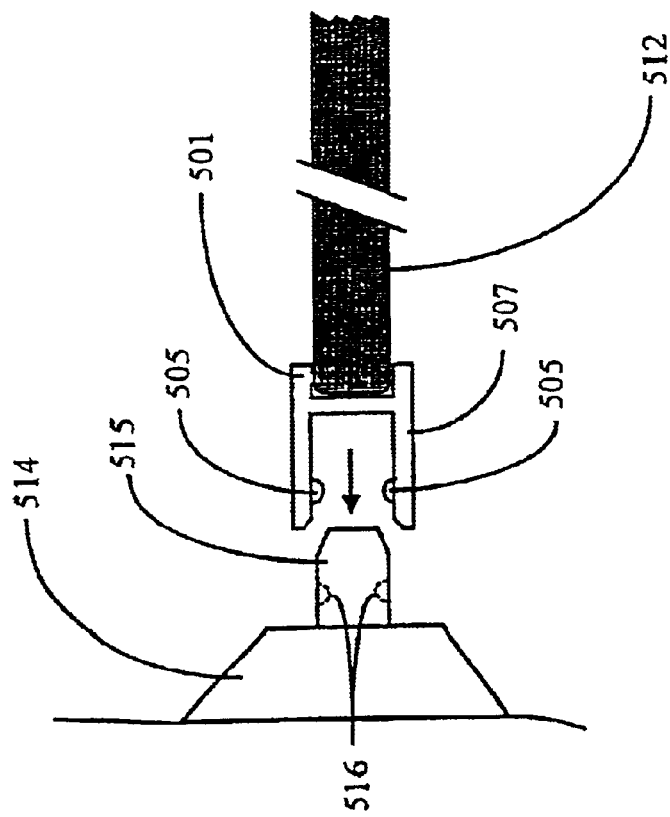
FIG. 5b is a side view of the clip of FIG. 5a, an eyeglasses strap and an eyeglasses temple piece and frame according to an embodiment of the present invention.
Figure 5A:
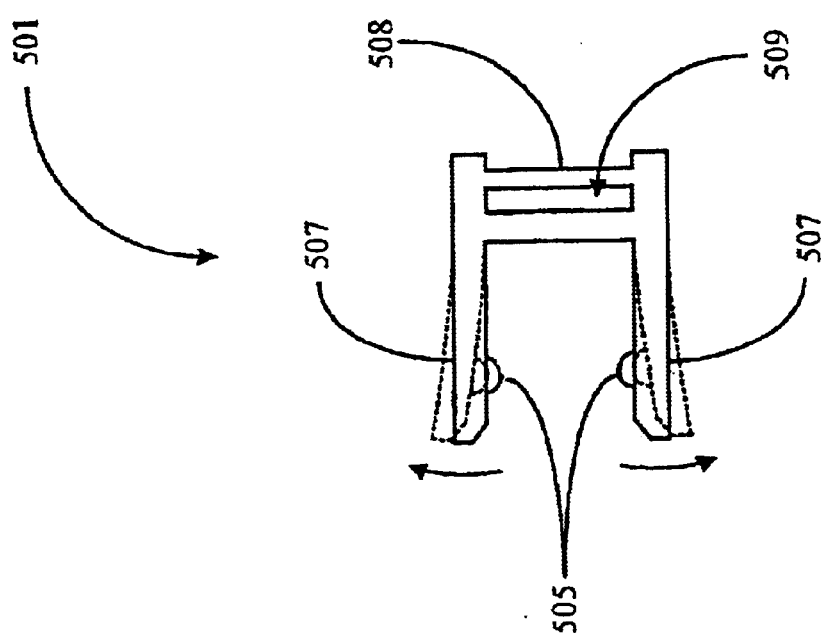
FIG. 5a is an elevation view of a strap clip according to another embodiment of present invention.

FIG. 5a is an elevation view of a strap clip according to another embodiment of present invention. A clip 501 may be manufactured of similar materials and of similar overall shape and size to the clip 301 of FIG. 3a. The clip 501 has two flexible arms 507 with the ability to be flexed outward in the direction indicated, returning to the original position when released, similarly to the clip 301 of FIG. 3a. Further, the arms 507 are angled or rounded at the outboard ends as shown. The clip 301 also has a post 508 creating a slot 509 through which an eyeglasses strap passes, both attributes also been similar to the clip 301 of FIG. 3a. However, instead of having notches such as those of the clip 301, the clip 501 has rounded protrusions 505 located on the inner surfaces near the ends of the arms 507 in a similar location to the notches 305 of the clip 301 of FIG. 3a.

FIG. 5b is a side view of the clip 501 of FIG. 5a, and shows an eyeglasses strap and an eyeglasses temple piece and frame according to an embodiment of the present invention. A temple piece 514 in this embodiment is attached to an eyeglasses frame 518 and is similar in size in shape to the temple piece 314 of FIG. 3b. The temple piece 514 is provided with a peg 515, similar in size to the peg 315 of FIG. 3b. Rounded notches 516 are provided in this embodiment in locations on opposite sides of the peg 515, and the notches extend into the peg 515 to a depth approximately equal to the height of the rounded protrusions 505 of the clip 501. The clip 501 can be seen attached to the eyeglasses strap 512 by a similar method used for the strap 312 and the clip 301 of FIG. 3b, but as is the case with previous components, the manner of attachment, either permanent or non-permanent, can vary in different embodiments. To attach the strap 512 to the temple piece 514, the clip 501 is slid ever the peg 515 in the direction indicated with the arms 507 spreading slightly outward as the protrusions 505 make contact with the sloped edges of the peg 515. The clip 501 is slid further over the peg 515 until the protrusions 505 align with the notches 516 and lock into place within the notches 515 due to the tendency of the arms 507 of the clip 501 to snap back into their original position. As is also true for the clip 301 of FIG. 3a, once fully inserted with the arms 507 snapped in place on the peg 515, disengagement may be easily accomplished, because of the rounded elements, by pulling the clips outwardly.

Figure 6A:
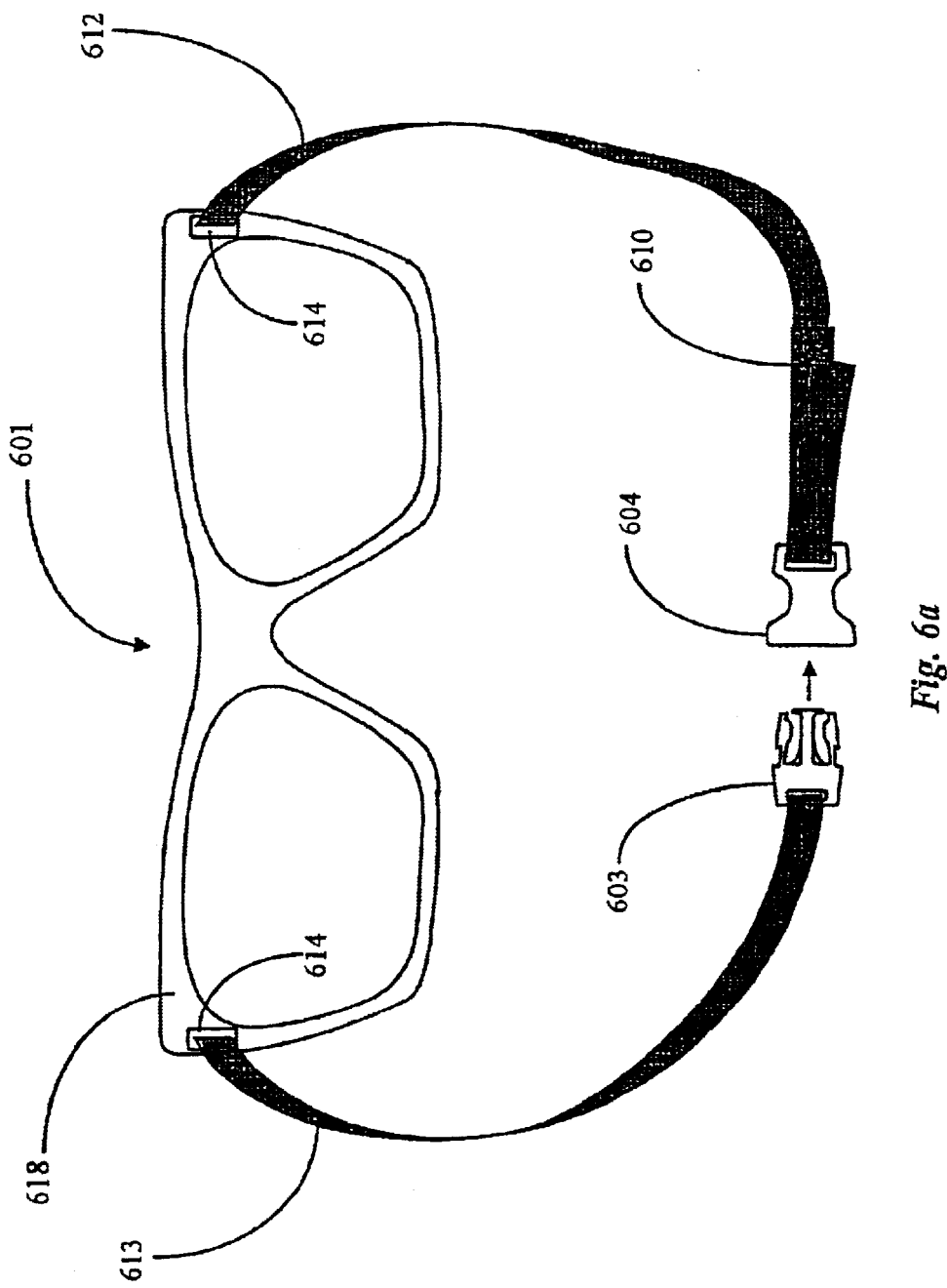
FIG. 6a is a rear view of an eyeglasses frame, straps and buckle according to another embodiment of the present invention.

FIG. 6a is a rear view of an eyeglasses frame, straps and buckle according to another embodiment of the present invention. The eyeglasses 601 in this embodiment have a frame 618 that is typical of a common eyeglasses frame known in the art. A temple piece 614 is located on either end of the frame 618 and is used, as are other temple pieces previously described, as an interface for attaching an eyeglasses strap to the frame. In this embodiment, the eyeglasses straps 612 and 613 are each attached to the temple pieces 614, and are connected at the other ends by utilizing a detachable clasp assembly comprising of a male clasp 603 attached to the strap 613, and a female clasp 604 attached to the strap 612. The male clasp 603 is designed to slide into the female clasp 604 in the direction indicated and lock in place once fully inserted. The strap 612 is attached in this embodiment to the female clasp 604 by first looping the strap through the slot in a rear of the female clasp 604. and then reattaching to itself utilizing a hook and loop fastener strip 610. By utilizing this structure, the user can quickly and easily adjust the length of the strap 612 by loosening the attached strap 612 from the hook and loop fastener strip 610, readjusting the length of the strap 612. and then reattaching the strap to the hook and loop fastener strip 610. Optionally, the hook and loop fasteners (such as, for example, is available under the VELCRO trademark) may be employed on both (opposite) sides of the strap for permitting a greater degree of size adjustment.

Figure 6B:
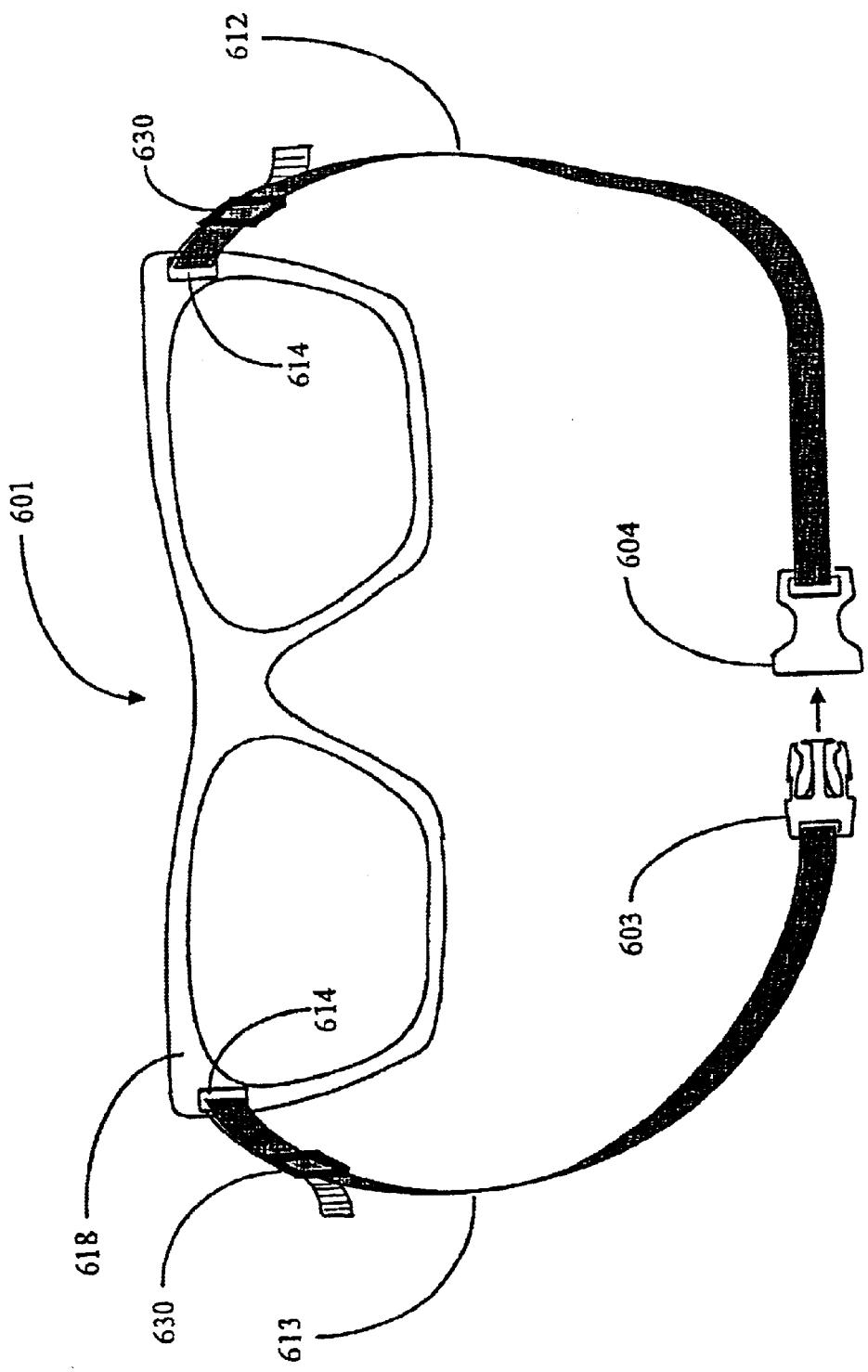
FIG. 6b is a rear view of an eyeglass frame, straps and buckles according to another embodiment of the present invention.
Figure 6D:
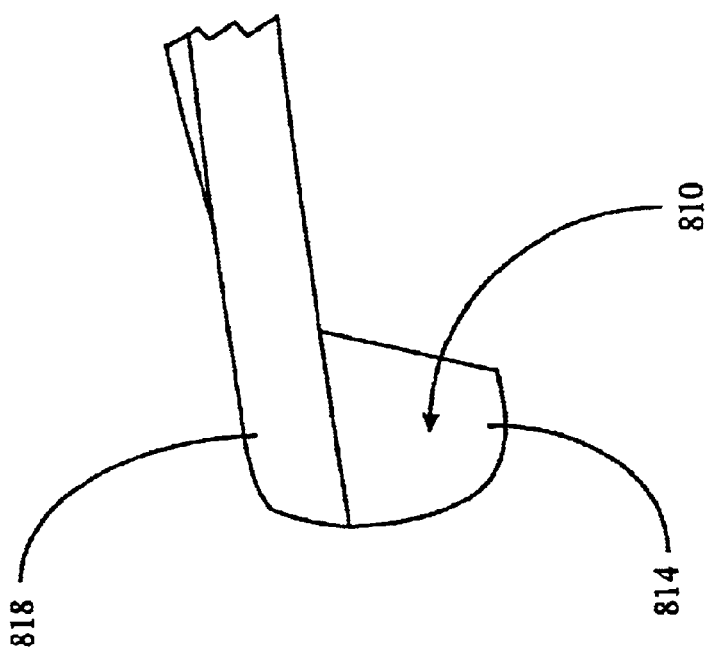
FIG. 6d is a top broken view of a portion of an eyeglasses frame, temple piece and eyeglasses strap according to yet another embodiment of the present invention.

FIG. 6b illustrates another embodiment of the invention that is similar to the embodiment of FIG. 6a, wherein the straps 612 and 613 are adjustably attached to the temple pieces of the frame, using buckles 630. In this embodiment, the strap 613 is attached to the element 604 without adjustment. There may be two buckles as shown, or there may be just one buckle, with all adjustments being made on one side. In other embodiments, the adjustment may be provided in other ways, such as by hook and loop fastener elements.

FIG. 6c is a top broken view of a portion of the eyeglasses frame 618, the temple piece 614 and the eyeglasses strap 613 according to an other embodiment of the present invention. In this enlarged view, the manner of the attachment of the strap 613 to the temple piece 614 utilized in this embodiment is more clearly seen. The temple piece 614 can be seen attached to the eyeglasses frame 618 using attachment methods previously described such as welding or bonding wit adhesive material, or in other embodiments may be molded into the frame 618 as an integral part of the frame. The temple piece 614 has a slot 616 extending down through a portion of the temple piece 614 to a depth in this embodiment of approximately half the height of the temple piece 614, with an opening in the rear of the temple piece 614 designed to allow for the insertion of a strap. The strap 613 is fitted with a pin 615 having a diameter slightly less than that of the slot or hole 616. and a height approximately equal to that of the depth of the hole 616. Attachment of the strap 613 to the temple piece 614 is achieved by the sliding pin 615, attached to the strap 613, down into the slot or hole 616 until it can slide no further. Detachment is achieved by simply lifting the strap 613, with the pin 615.attached, upward and out of the slot 616.

Figure 7B:
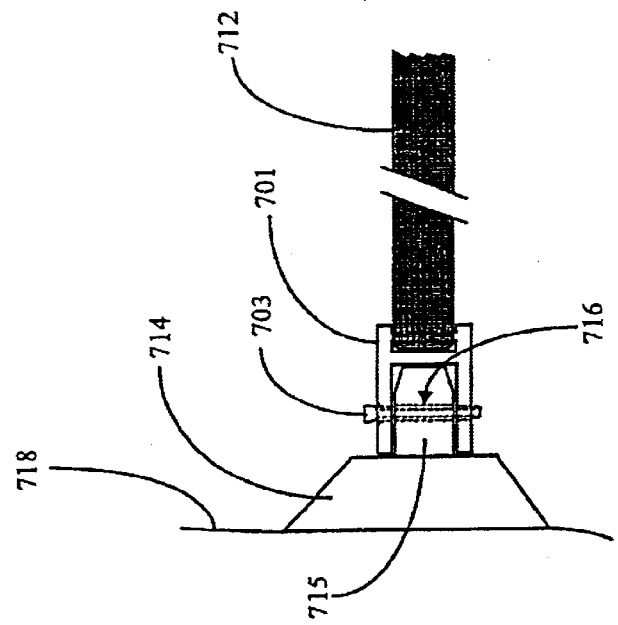
FIG. 7b is a side view of the clip and securing pin of FIG. 7a, and eyeglasses strap and an eyeglasses temple piece according to an embodiment of the present invention.
Figure 7A:
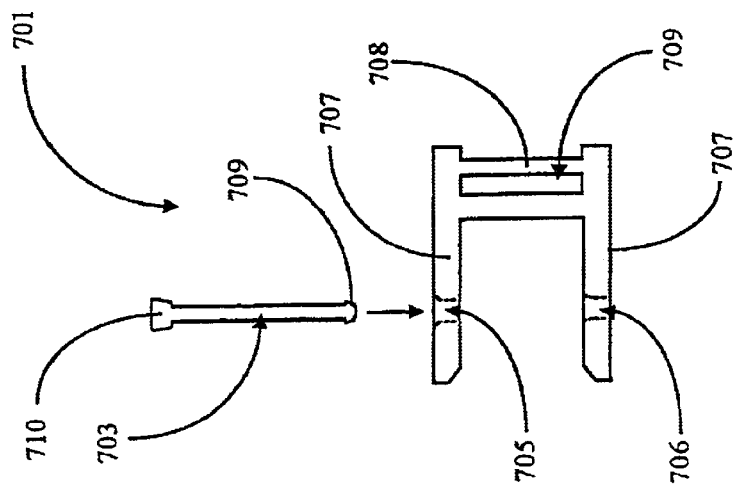
FIG. 7a is an elevation view of a strap clip and securing pin according to another embodiment of present invention.

FIG. 7a is an elevation view of a strap clip and securing pin according to another embodiment of present invention. The clip 701 is provided as another alternative for securing and eyeglasses strap to an eyeglasses frame. The clip 701 has a rectangular shape and is of a size Similar to the clip 501 of FIG. 5a. A post 708 is also provided similarly to previous rectangular clips descried creating a slot 709 through which the end of a securing strap will pass. The clip 701 is provided with arms 707 also similar to the rectangular clips previously described but with the upper arm having a hole 705 passing completely through, and the lower arm having a hole 706 also passing completely through and having a diameter slightly less than that of the upper hole 705. The securing pin 703 is provided having a length slightly greater than the height of the clip 701 and a body diameter slightly less than that of the holes 705 and 706. The securing pin 703 has a top cap 710 with a diameter slightly greater than that of the body of the pin 703, and a bottom cap 709 also a diameter slightly greater than the body of the pin 703 but slightly less than that of the top cap 710. The pin 710 is designed to be inserted down in the direction indicated first passing through the hole 705, and then passing completely through the hole 706 until it can travel no further due to the bottom edge of the top cap 710 resting on the upper surface of the arm 707. As previously mentioned, the pin 703 is of a length slightly greater than the overall height of the clip 701 so that when the pin 703 is of a length slightly greater than the overall height of the clip 701 so that when the pin 703 is fully inserted, the bottom cap 709 passes just far enough through the hole 706 so that the raised portion of the bottom cap 709 passes just far enough through the hole 706 so that the raised portion of the bottom cap 709 snaps into place within the hole 706. The pin 703 is designed so that it may be removed from the clip 701 by grasping the upper cap 710 and pulling the pin 703 up and out of the clip 701.

FIG. 7b is a side view of the clip 701 and the securing pin 703 of FIG. 7a, and the eyeglasses strap and an eyeglasses temple piece according to an embodiment of the present invention. The temple piece 714, attached to the frame 718, is similar to the temple piece 514 of FIG. 5b. A peg 715 is also provided being similar in size and shape to the peg 515 but instead of notches as with the peg 515, the peg 715 has a hole 716 passing completely through the peg 715 and having a diameter slightly larger than that of the pin 703. The clip 701 can be seen attached to an eyeglasses strap 712 using methods previously described. As shown, the method of attaching the strap 712 to the temple piece 714 using the clip 701 is achieved by sliding the clip 701, attached to the strap 712, over the peg 715 until the holes 705 and 706 of the clip 701 align with the hole 716 of the peg 715. Once the holes are aligned, the pin 703 is inserted through the holes of the clip 701 and the peg 715 and locking into place.

In some embodiments of the invention, the clip 701 may be fashioned as an element with a rectangular opening such that it encloses the peg 715 completely when engaged. This is true as well of the arrangements illustrated in FIGS. 3a, 3b, 5a and 5b.

Figure 8B:
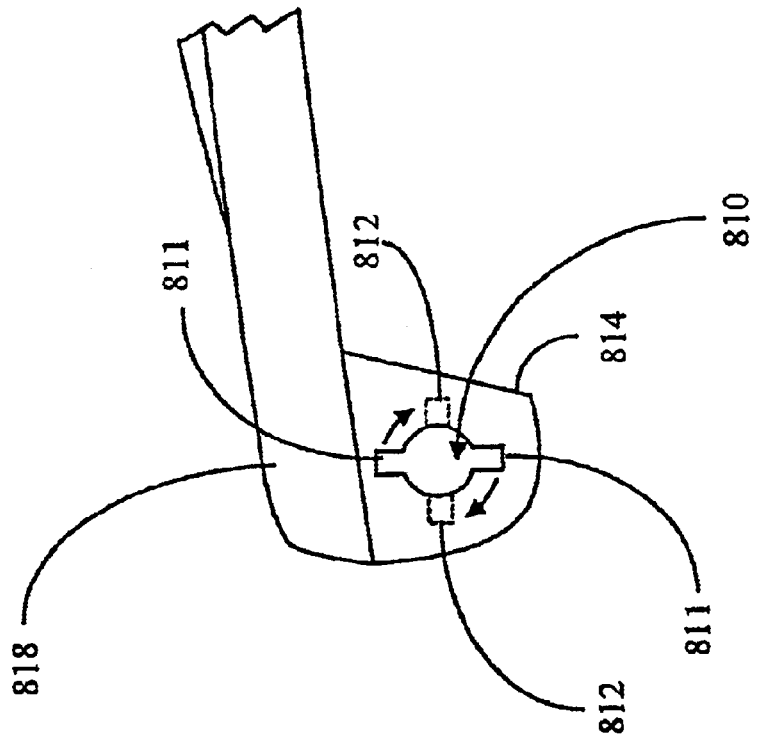
FIG. 8b is a top broken view of a portion of eyeglasses frame and temple piece according to an embodiment of the present invention.
Figure 8A:
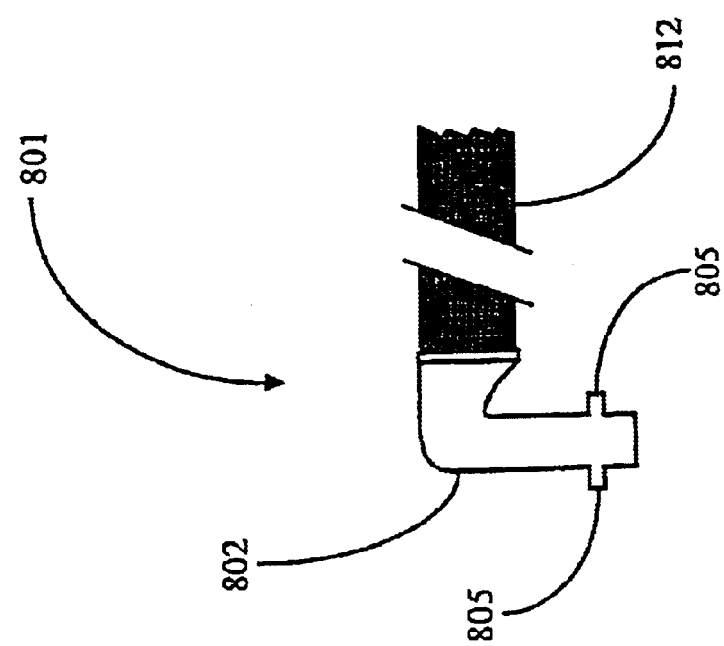
FIG. 8a is an elevation view of an eyeglasses strap with angled swivel clip according to another embodiment of the present invention.

FIG. 8a is an elevation view of an eyeglasses strap with angled swivel clip according to another embodiment of the present invention. The clip 801 is provided with an angled body 802 attached to an eyeglasses strap 812 utilizing various means previously mentioned. The lower portion of the angled body 802 is similar in shape and size to the swivel clip 401 of FIG. 4a and has similar protrusions 805 located on opposing sides.

FIG. 8b is a top broken view of a portion of the eyeglasses frame and the temple piece according to an embodiment of the present invention. The eyeglasses frame 818 is provided with an attached temple piece 814 that is similar to other embodiments previously described. A hole 810 is located approximately in the center of the temple piece 814 and extends to a depth of approximately half the height of the temple piece 814, and has a diameter slightly larger than that of the circular body clip 801. The hole 810 is also provided with notches 811 and 812, which have approximately the same shape but have slightly larger dimensions than the protrusions 805 of the clip 801. The hole 810 is designed to accommodate the insertion of the clip 801. Attachment of the inserted clip 801 to the temple piece 814 is achieved by first inserting the clip 801 into the hole 810 and rotating the clip 801 approximately 90 degrees, a method substantially identical to the method described for the clip 401 and the hole 410 of FIG. 4b.

Figure 8C:
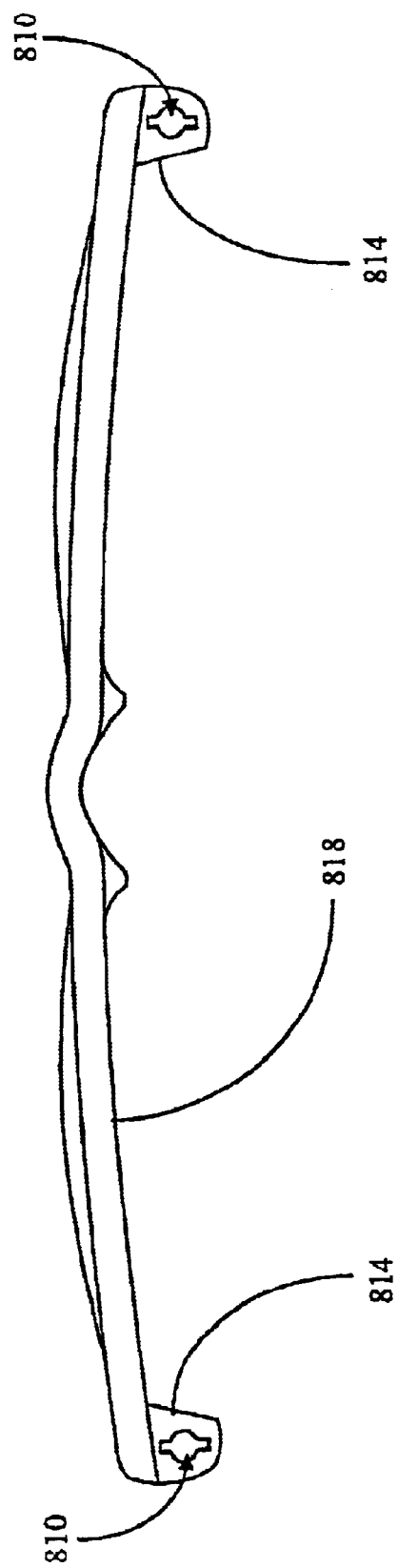
FIG. 8c is a top view of the eyeglasses frame of FIG. 8b.

FIG. 8c is a top view of the eyeglasses frame 818 of FIG. 8b. In this view, the eyeglasses frame 818 can be seen in its entirety with a temple piece 814 at each end with the holes 810 extending into each.

Figure 9B:
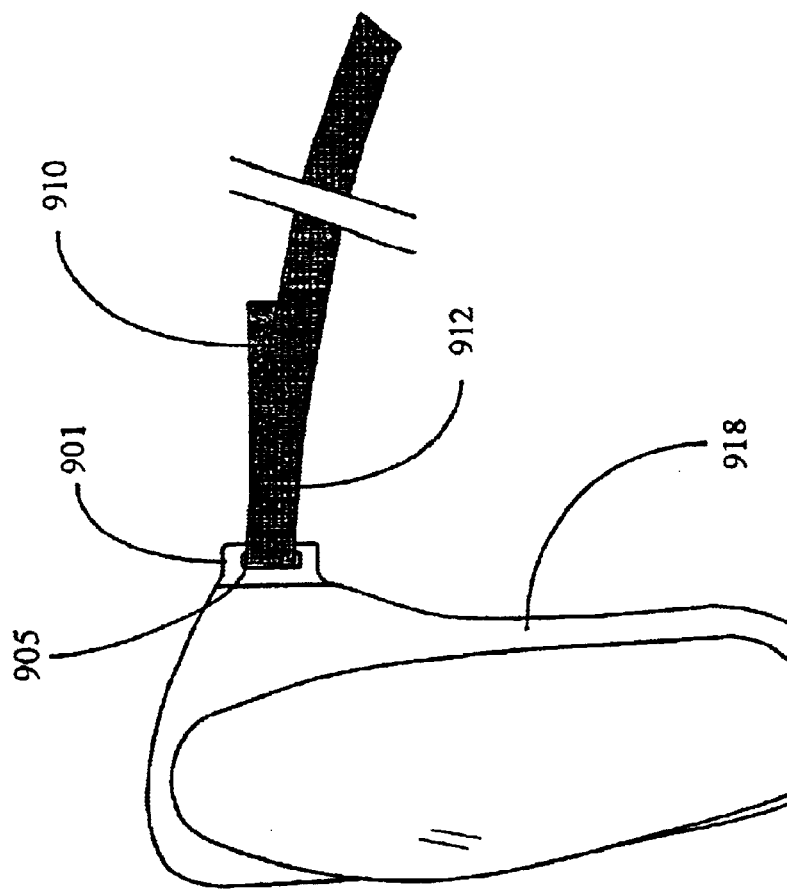
FIG. 9b is a side view of eyeglasses utilizing the temple piece of FIG. 9a and an eyeglasses strap according to an embodiment of the present invention.
Figure 9A:
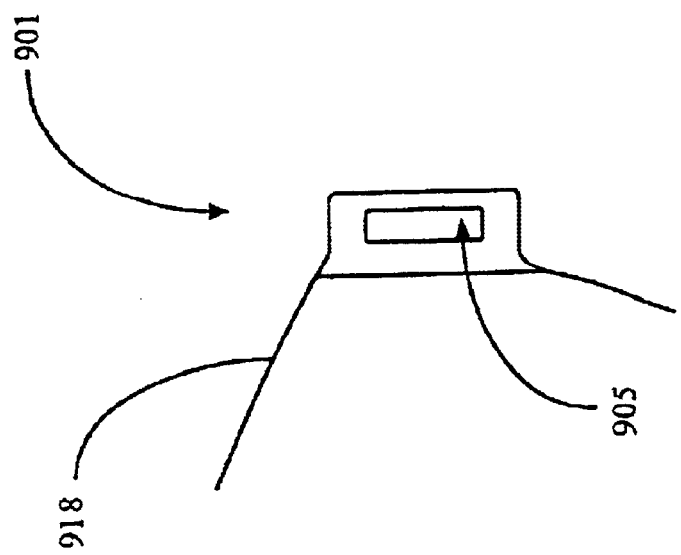
FIG. 9a is elevation view of an eyeglasses temple piece according to another embodiment of the present invention.

FIG. 9a is elevation view of an eyeglasses temple piece according to another embodiment of the present invention. The temple piece 901 is provided in this embodiment as another alternative for securing an eyeglasses strap to an eyeglasses frame. The temple piece 901, which is substantially rectangular in shape in this embodiment and may have other shapes in other embodiments, is secured to the eyeglasses frame 918 using methods previously described, and has a slot 905 designed for the insertion of the end of an eyeglasses strap.

FIG. 9b is a side view of eyeglasses utilizing the temple piece 901 of FIG. 9a and an eyeglasses strap according to an embodiment of the present invention. The eyeglasses strap 912 is similar to the eyeglasses strap 612 of FIG. 6a, and similarly has a hook and loop fastener strip 910 at one or both ends. To attach the strap 912 to the temple piece 901, the end of the strap 912 may have a hook and loop fastener strip 910 is inserted through the slot 905 and then the strap may be reattached to itself utilizing the hook and loop fastener strip 910. In this manner the user can easily readjust the strap 912 by simply lifting the hook and loop fastener strip 910, performing the desired adjustment, and reattaching the hook and loop fastener strip 910. The hook and loop fastener elements can be arranged on different sides in different embodiments of the invention.

Figure 9D:
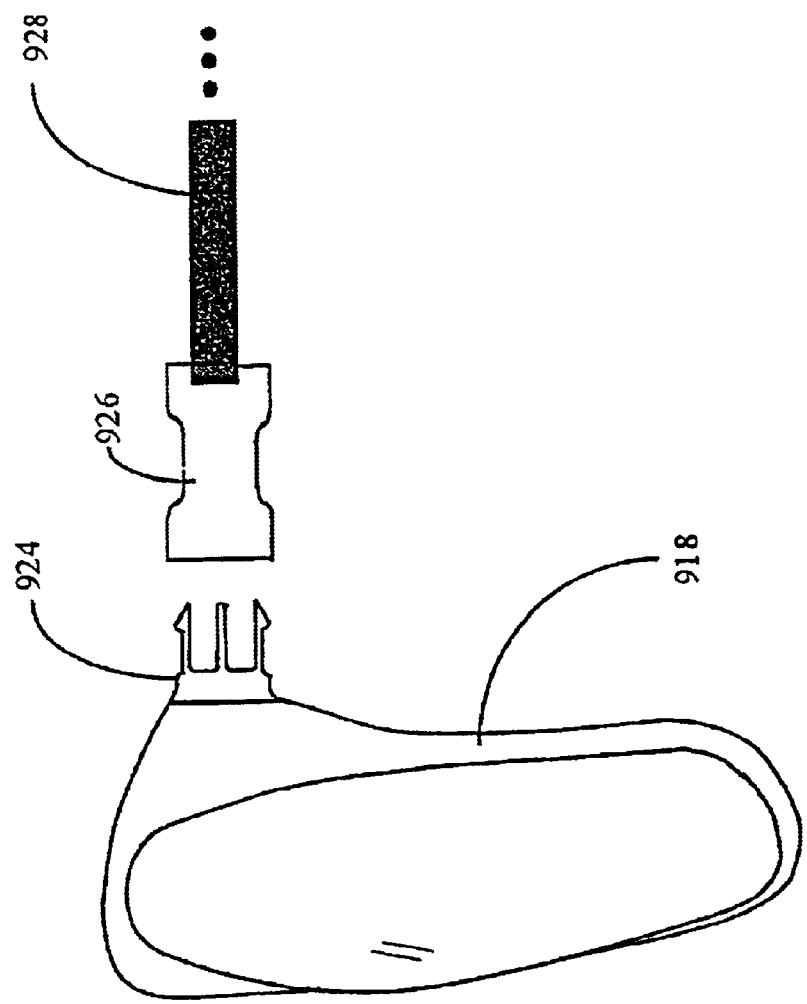
FIG. 9d illustrates the frame and temple piece of FIG. 9a in relation to a retainer and strap.
Figure 9C:
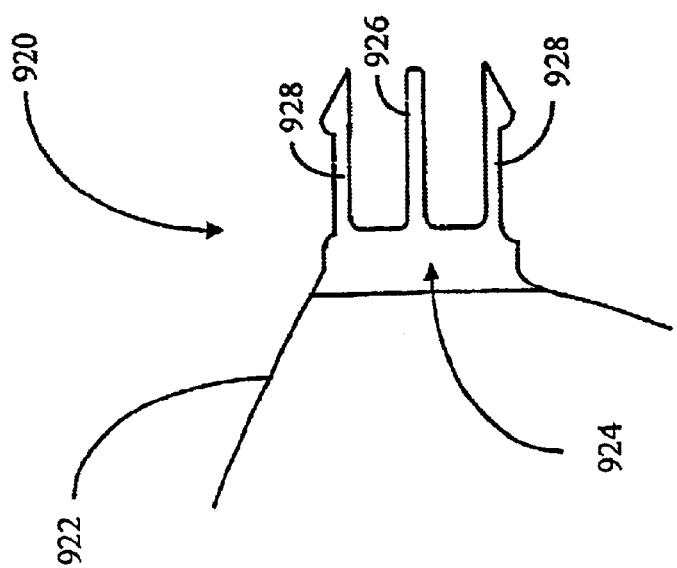
FIG. 9c is a side view of a glasses frame with a temple piece according to an alterative embodiment of the invention.

FIGS. 9c and 9d illustrate yet another attachment arrangement in an embodiment of the present invention. In this embodiment, the frame 922 has a temple piece 924 having a three post extension. The extension 928 comprises flexible extensions with retaining shoulders, and the extension 926 acts as a guide. FIG. 9d illustrates the frame 922 with the temple piece 924, and a retaining socket element 926 which is fashioned to engage the temple piece 924 in a manner allowing easy disengagement as described above in connection with FIGS. 2a, 2b, 3a, 3b, 5a, and 5b. The element 926 also has a post for passing a strap 928 about the post. The strap 928 may have hook and loop elements allowing the strap to fold back upon itself to engage the hook and loop elements. There are likewise a number of other ways the strap may be secured to the element 926. For example, the strap 928 may pass through the element 926 and be secured with an adjustable buckle on one or both sides of the frame.

It will be apparent to the skilled artisan that the arrangement of elements as shown in FIGS. 9c and 9d can be interchanged, with the male elements mounted on the frame and female elements mounted on the lace assembly.

FIG. 9e illustrates a side view of a frame 960 having a temple piece 962 with a female thread. An element 964 with a male thread secures the strap 968, which can be attached to the element 964 in any of a broad variety of ways, such as, for example, with hook and loop fastener elements. Again, the skilled artisan will appreciate that the frame 960 may have a male thread formed thereon.

FIG. 9f illustrates yet another embodiment for joining laces (including bands and retainers) sets to eyeglasses frames in an embodiment of the present invention. In this embodiment, the eyeglasses frame 970 has temple pieces with a simple cylindrical (or extension) post 972 located on each side. A lace or strap 976 has an end piece 974 that is made of flexible material (such as, for example, synthetic or natural rubber) and has a bore 973 with a diameter smaller than the diameter of the post 972. Because of the flexibility of the material of the element 974, the post can be inserted into the bore, but will not easily be removed. The holding power will be enough to ensure that the laces will not disengage in normal use. When it is desired to remove the laces, it may be done by pulling with sufficient tension to do so.

FIG. 10a is a broken view of the end of an eyeglasses strap according to another embodiment of the present invention. The eyeglasses strap 1001 is provided as yet another alternative embodiment for securing an eyeglasses strap to an eyeglasses frame. The strap 1001 in this embodiment has a main portion 1016, the end of which passes through the sheath 1003, loops about to create loop 1015, and then the strap is reinserted into the sheath 1003 and is attached at that point. Optionally, the sheath may be made of a heat shrinkable material.

FIG. 10b is a top broken view of a portion of an eyeglasses frame, temple piece, and securing pin according to an embodiment of the present invention. In this embodiment, the eyeglasses frame 1018 has a temple piece 1014 having two arms extending out from the frame 1018. Holes 1017 are located approximately in the center of each arm of the temple piece 1014 and pass completely through each arm. A pin 1015 is provided having a length approximately equal to the overall width of the temple piece 1014, and is of a diameter controlled to produce a snug fit with the holes 1017. The manner of attachment in this embodiment is accomplished by first inserting the looped end of the eyeglasses strap 1001 in between the arms of the temple piece 1014, and aligning the hole of the loop 1015 with the holes 1017 of temple piece 1014. Once aligned, the pin 1015 is inserted through the first hole of the temple piece 1014 in the direction indicated, through the loop 1015 of eyeglasses strap 1001 and into the second hole. The securing of the pin 1015 in the holes 1017 is due to the snug fit achieved by a diameter of the pin 1015 being controlled to produce a snug fit in the holes 1017. To remove the strap 1001 from the temple piece 1014, a user is simply required to manually move the pin 1015 out of at least one of the holes 1017 to thereby release the strap 1001.

Figure 10C:
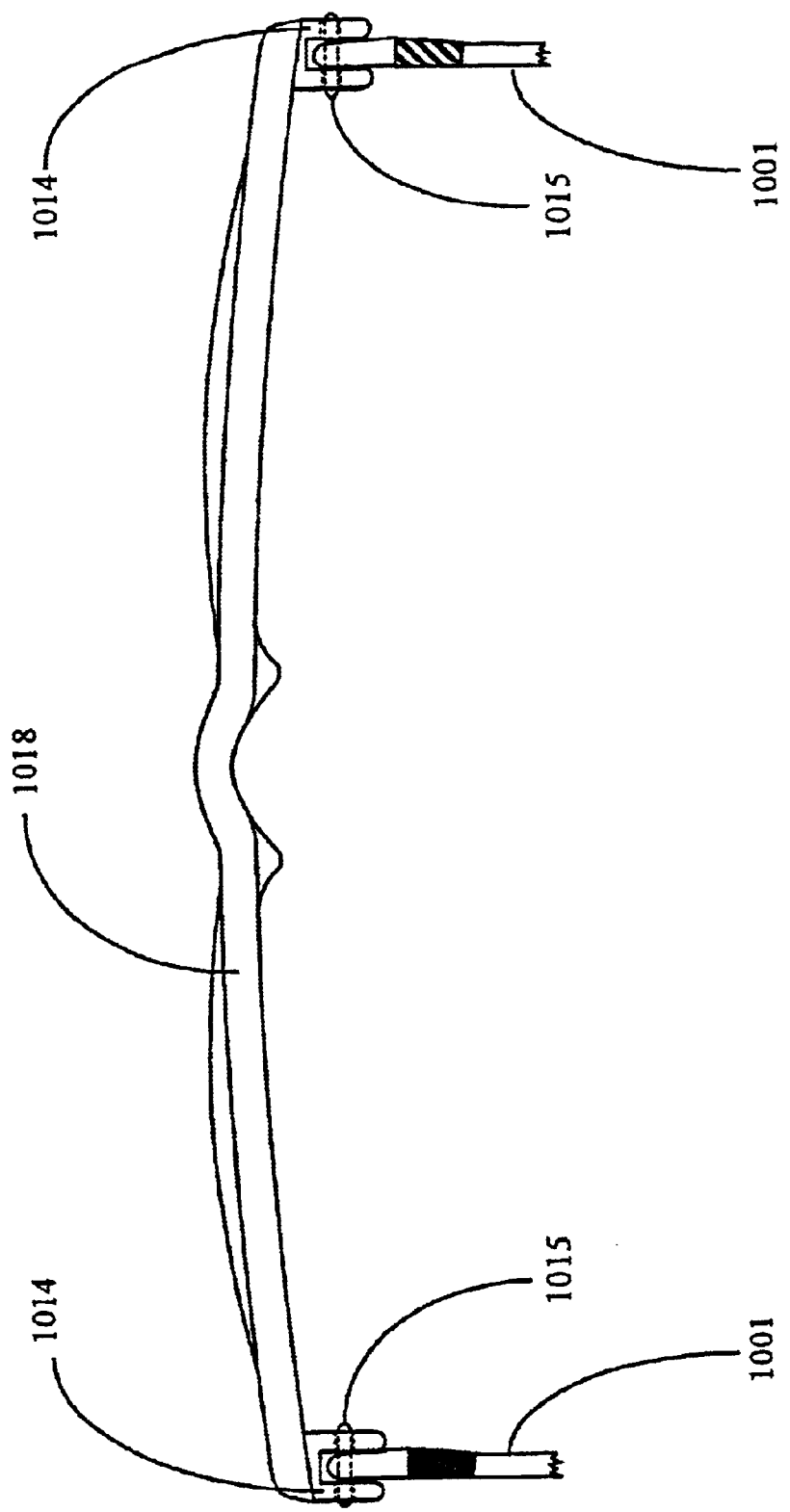
FIG. 10c is a top view of the eyeglasses frame, temple pieces and securing pin of FIG. 10b used with the eyeglasses strap of FIG. 10a according to an embodiment of the present invention.

FIG. 10c is a top view of the eyeglasses frame 1018, the temple pieces 1014, and the securing pin 1015 of FIG. 10b, used with the eyeglasses strap 1001 of FIG. 10a according to an embodiment of the present invention. In this view, the eyeglasses frame 1018 can be seen in its entirety with the eyeglasses straps 1001 in their proper location secured by the pins 1015 as previously described. In other embodiments, the straps may be joined in many other ways, as indicated, for example, in FIGS. 10d, 12a, 12b, 12c and 12d.

Figure 10D:
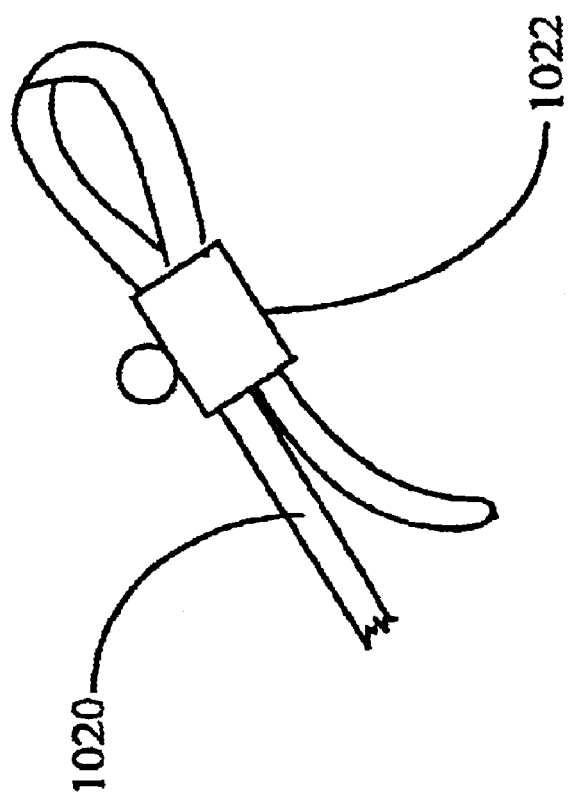
FIG. 10d illustrates a friction element for adjusting laces in an embodiment of the invention.

FIG. 10d shows a lace 1020 and a friction clamp 1022 that may be used in alternative embodiment of the present invention for adjusting and holding laces. In this arrangement, a friction clamp 1022 has a portion of the lace passing therethrough, a portion forming a loop, and another portion passing through the friction clamp again. The friction clamp allows either portion or leg of the lace passed through the clamp to be adjusted by pulling on the lace. The clamp itself can take any one of many forms, such as, for example, a simple ring with the size controlled to provide clamping for certain size laces. It may also comprise a spring-loaded device such that laces of different sizes may be used.

Figure 11B:
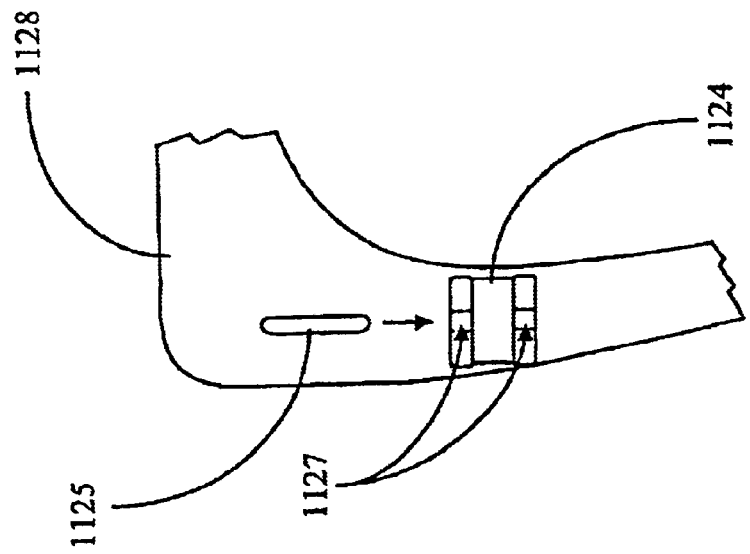
FIG. 11b is a rear broken view of the eyeglasses frame and temple piece of FIG. 11a, and securing pin according to an embodiment of the present invention.
Figure 11A:
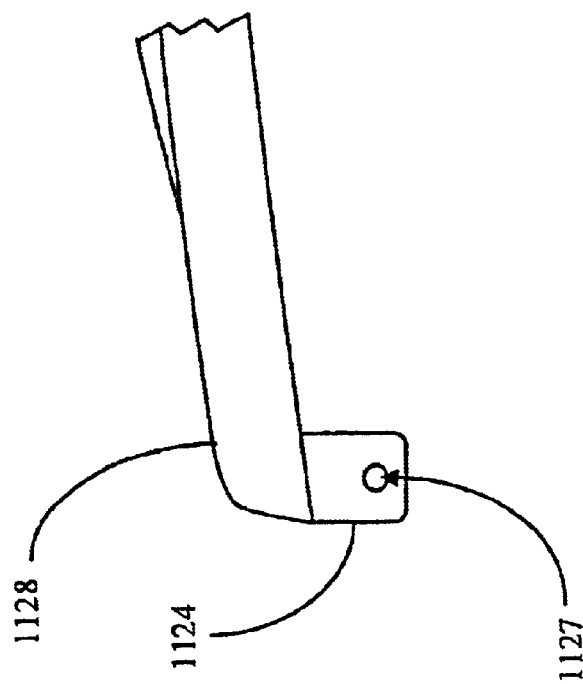
FIG. 11a is a top broken view of a portion of eyeglasses frame and temple piece according to another embodiment of the present invention.

FIG. 11a is a top broken view of a portion of an eyeglasses frame and a temple piece according to another embodiment of the present invention. A temple piece 1124 is attached to an eyeglasses frame 1128 utilizing structures previously described, and is similar in size in shape to the temple piece 1014 of FIG. 10, having a hole 1127 passing through each arm of the temple piece 1124. In this embodiment however, the temple piece 1124 is oriented substantially horizontal in its orientation to the eyeglasses frame 1128.

FIG. 11b is a rear broken view of eyeglasses frame 1128 and temple piece 1124 of FIG. 11a, and securing pin according to an embodiment of the present invention. Securing pin 1125 is provided also being similar in size and shape to pin 1015 of FIG. 10b. Temple piece 1124 and pin 1125 are designed to be used with an eyeglasses strap similar to strap 1001 of FIG. 10a when securing the strap to the temple piece. The method of attaching an eyeglasses strap in this embodiment may be identical to the manner previously described with respect to FIG. 10b.

Figure 12B:
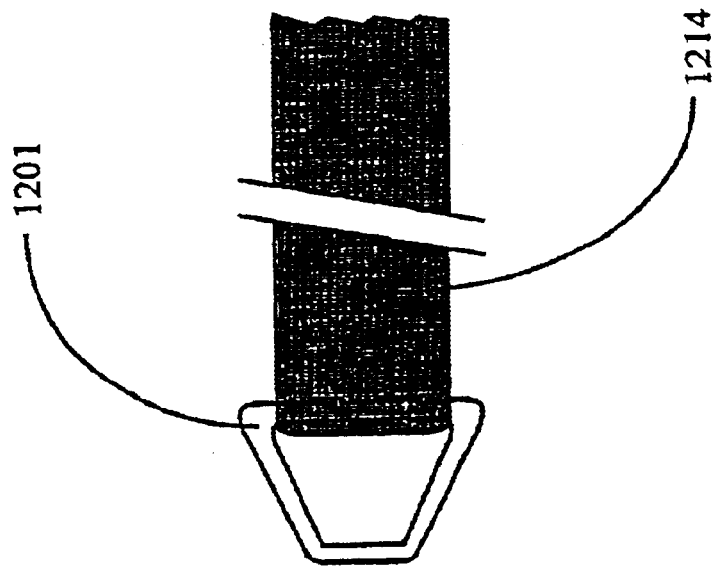
FIG. 12b is an elevation view of the securing ring of FIG. 12a used with a large eyeglasses strap according to another embodiment of the present invention.
Figure 12A:
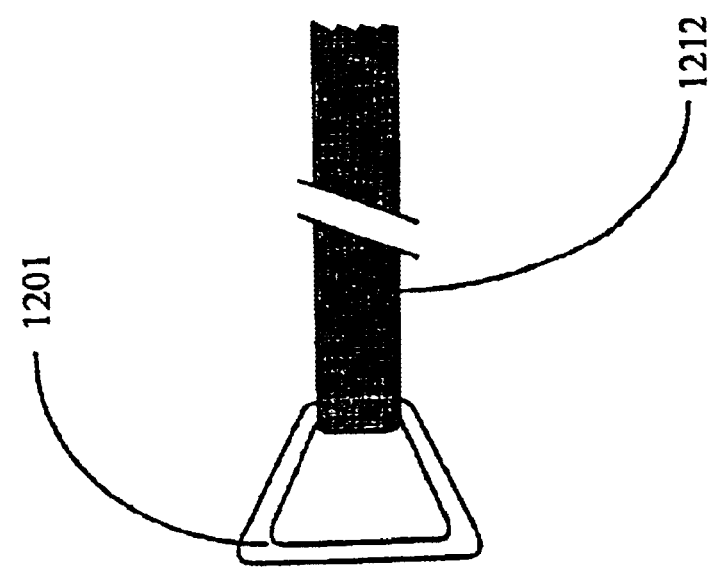
FIG. 12a is an elevation view of a securing ring and small eyeglasses strap according to another embodiment of present invention.

FIG. 12a is an elevation view of a securing ring and a small eyeglasses strap according to another embodiment of present invention. The ring 1201 in this embodiment may be trapezoidal in shape. with one of the parallel sides having a greater length than the other of the parallel sides. Optionally, the ring may be "D" shaped. The ring 1201 may be manufactured of metal or other similarly strong wire material and is designed to be used with eyeglasses straps of different sizes. Other materials may be suitably used, such as synthetic materials and plastics.

In this view. the smaller eyeglasses strap 1212 is attached to the smaller end of the ring 1201 using any of the various structures previously described. The manner of attachment can be permanent or non-permanent in the various embodiments.

FIG. 12b is an elevation view of the securing ring 1212 of FIG. 12a used with a relatively large eyeglasses strap according to another embodiment of the present invention. To accommodate the larger strap, the ring 1201 may be flipped horizontally so that the larger of the two parallel sides is the side used for attaching the larger strap 1214. As is true with the relatively smaller strap 1212, the larger strap 1214 can be attached to the ring 1201 utilizing a variety of methods previously described.

Figure 12D:
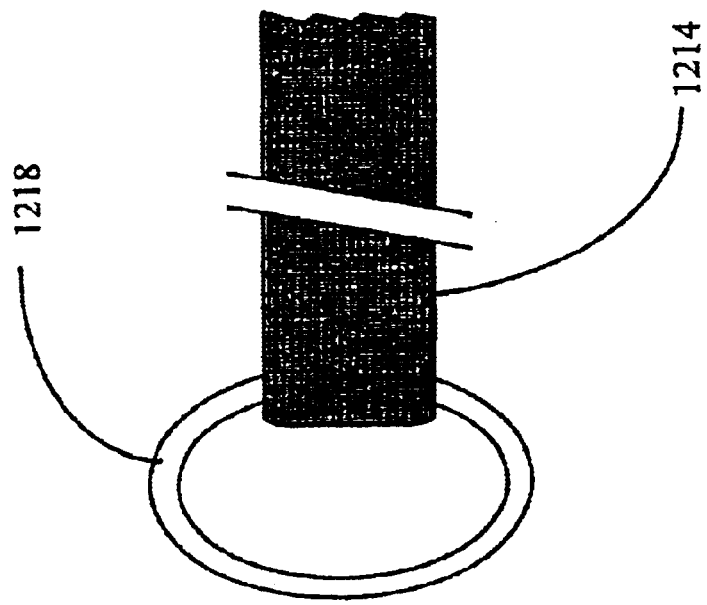
FIG. 12d is an elevation view of an oval securing ring and larger eyeglasses strap according to another embodiment of the invention.
Figure 12C:
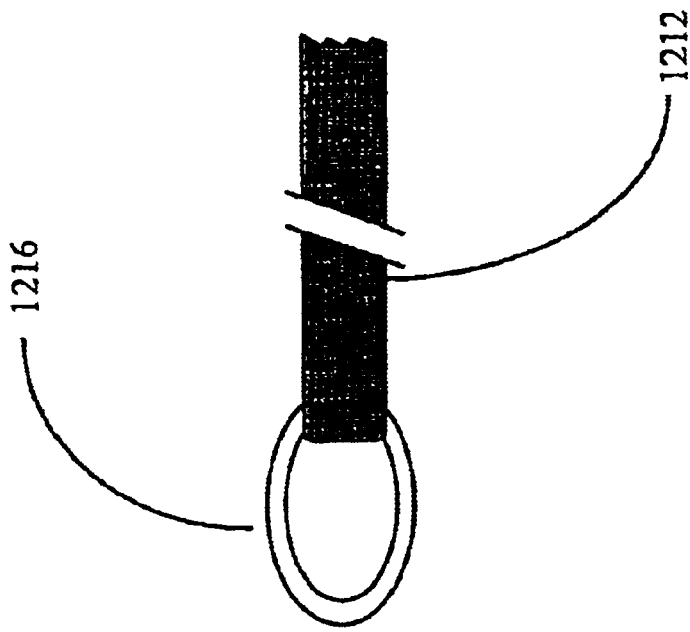
FIG. 12c is an elevation view of an oval securing ring and small eyeglasses strap according to another embodiment of the invention.

FIG. 12c is an elevation view of an oval securing ring and a small eyeglasses strap in another embodiment of the present invention. FIG. 12d is an elevation view of an oval securing ring and a larger eyeglasses strap in another embodiment of the present invention. The securing rings can take these shapes and other shapes.

FIG. 13 is a view of a side of another embodiment of the invention with a portion of the strap or lace broken away. This embodiment of the invention employs a structure somewhat similar to the embodiment of the invention shown in FIG. 9f that was discussed above. In this embodiment, an enlarged post 1300 is mounted on the opposite sides of the eyeglasses frame 1302. The posts 1300 extend rearwardly from the frame 1302 in a substantially perpendicular orientation to a plane of the frame 1302. A socket 1304 formed on a securing member 1306 removably receives the post 1300. The post 1300 and socket 1304 may have a shape and size such that an interference fit is produced therebetween when the post is inserted into the socket. To facilitate the insertion of the post into the socket and the subsequent removal of the post from the socket, the securing member 1306 may be formed of an elastomeric material that permits a small degree of resilient expansion of the socket when the post is inserted into the socket. The post may be covered by a material that resists sliding movement on its surface, such as an elastomeric material that exhibits a degree of "tackiness", that resists the slippage of the socket of the securing member from the post. A strap 1308 may be attached to the securing member 1306 in any of the ways described above. Optionally, the strap 1308 may be tubular such that an end of the tubular strap removably receives the post for connecting the parts. As a further option, the diameter of the post may be enlarged at its free end as compared to its base end mounted on the frame.

FIG. 14 is a view of a side of another embodiment of the invention showing a portion of the temple portion 1400 of an eyeglasses frame and a portion of a lace or strap 1402. In this embodiment, a ring assembly 1404 is employed to removably mount the strap 1402 to the temple portion 1400. The temple portion 1400 may be provided with a channel 1406 for receiving a portion of the ring assembly 1404. The ring assembly 1404 may include a movable tongue 1408 that is slidably mounted in a recess formed in the ring of the ring assembly, and a tab 1410 may be mounted on and extend from the tongue 1408 so that the user's finger may engage the tab to move the tongue. A biasing means (not shown), such as a compression spring, may be mounted on the ring for biasing the tongue 1408 into an extended position from a retracted position.

FIG. 15 is a top view of a portion of another embodiment of the invention with a portion of an eyeglasses frame 1500 and a portion of a strap 1502. A temple portion 1504 of the frame 1500 has a pair of rearwardly extending arms 1506, 1508 that are spaced from each other to define a gap 1510 therebetween. The securing pin 1512 is inserted through a hole in one of the arms 1506, 1508, and the pin 1512 may have enlarged ends 1514 that are relatively larger than the hole so that the pin is incapable of being completely withdrawn from the hole. The pin 1512 also may include a shaft 1516 that extends through the hole and is able to move or slide in the hole. A biasing means, such as, for example, a spring 1518, may be mounted on the pin 1512 to bias the pin into a securing position (shown in broken lines in FIG. 15) in which the pin extends between the arms 1506, 1508 and spans the gap 1510 between the arms. The securing pin 1512 may be moved out of the securing position to a release position (shown in solid lines in FIG. 15) bu pulling on one of the ends 1514 of the securing pin 1512. The strap 1502 may have a loop 1520 formed on its end that may receive a portion of the securing pin 1512 so that the loop traps and attaches the end of the strap 1502 between the arms 1506, 1508 in the gap 1510 when the securing pin extends through the loop 1520 and is in the securing position. Movement of the securing pin 1512 from the securing position to the release position permits the loop 1520 to be unhooked or released from the securing pin.

Figure 16:
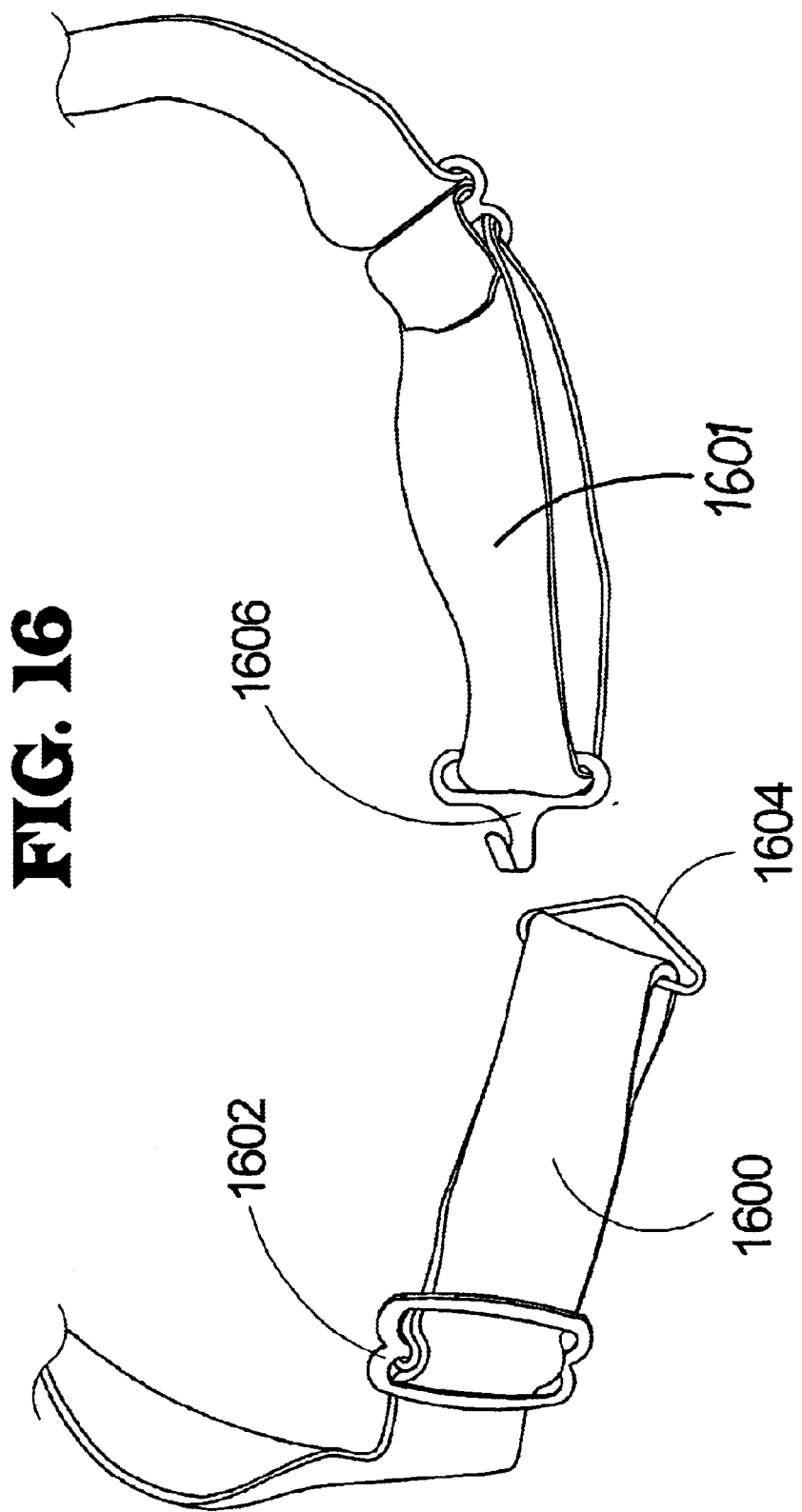
FIG. 16 is a rear view of another embodiment of the present invention showing a broken away portion of the lace structure with a double loop slider member for adjusting the length of the lace structure and a clip structure for removably connecting portions of the lace structure.

FIG. 16 shows a portion of one embodiment of the lace structure of the present invention in which the lace structure includes two portions 1600, 1601 that may be of substantially equal length. Each of the lace portions has a first end section that is connected to a frame (not shown) at the temple portion by one of the structures described above, or optionally by another suitable structure. Each of the lace portions also has a second end section opposite of the first end section on the lace portion, and the second end sections are each looped back upon themselves to create a loop.

In the embodiment depicted in FIG. 16 the loops formed by each of the lace portions may be removably coupled together by means such as a clip structure formed of two components 1604, 1606, with each of the components having a portion of the loop of one of the lace portions extended through the component. In one embodiment, one component 1604 of the clip structure comprises a bow component and the other component 1606 comprises a hook component that is removably hookable on the bow component to join the loops formed by the lace portions.

Second ends of the lace second end sections are secured to intermediate sections of the lace portions, and this may be accomplished by a double loop slider member 1602 that may have the second end attached to a central bar of the double loop slider member and may have a portion if the intermediate section of the lace portion extended through each of the loops of the double loop slider member. The double loop slider member is slidable along the intermediate section of the lace portion to increase or decrease the size of the loop formed by the second end section, and thereby adjusting the effective length of the lace portion between the first end on the first end section and the furthest extent of the loop from the first end. Thus, the effective length of the lace portion between the first end of the lace portion and the associated component 1604, 1606 of the clip structure is adjustable to accommodate the size of the head of the user. The location of the loop formed by the second end section of the lace portions has been found to be preferable to locating the loop adjacent to the first end of the lace portion.

It will be apparent to a worker of ordinary skill that there are many alterations that may be made in the embodiments described herein without departing from the overall spirit and scope of the present invention. For example. the adjustable arrangements for fastening straps to frames of fastener elements may be implemented in many different materials in various widths, and in various colors and patterns. There are many other alterations that may be made in the embodiments described without departing from the spirit and scope of the invention. For these reasons the invention should be afforded the broadest possible scope limited only by the language of the clams that follow.

It is also to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. An eyeglasses system, comprising:

an eyeglasses frame having a pair of opposite temple regions;

a lace structure having opposite ends; and coupling means for removably coupling each of the opposite ends of the lace structure to one of the temple regions of the eyeglasses frame;

wherein the coupling means comprises a male coupler element and a female coupler element, the male and female coupler elements being removably couplable together, the male coupler element being mounted on one of the lace and the eyeglasses frame and the female coupler clement being mounted on the other of the lace and eyeglasses frame;

wherein the male coupler element comprises a peg being elongate with a transverse cross section having a substantially circular shape, the peg of the male coupler element having a pair of protrusions, a first one of the pair of protrusions extending in a substantially diametrically opposite direction from a second one of the pair of protrusions;

wherein the female coupler element comprises a slot formed on the temple region of the eyeglass frame, the slot removably receiving the peg of the male coupler element, the slot having a generally cylindrical shape, an inner surface defining an interior of the slot, a pair of opposed grooves being formed on the inner surface for receiving the protrusions as the peg is moved into and out of the slot, a pair of notches each being formed in the inner surface at a location along one of the grooves, the notches being adapted to permit rotation of the peg of the male coupler element in the slot to lodge the protrusions in the notches such that longitudinal movement of the male coupler element out of the slot is resisted.

2. An eyeglasses system, comprising:

an eyeglasses frame having a pair of opposite temple regions;

a post being mounted on the eyeglasses frame at each of the pair of opposite temple regions, each of the posts, extending in a rearward direction from the eyeglasses frame; and a lace structure having opposite ends, each of the opposite ends defines a cavity for removably receiving one of the posts on the eyeglasses frame for connecting the lace structure to the eyeglasses frame the lace structure being flexible between the opposite ends, the lace structure having a substantially uniform width between the opposite ends;.

wherein each of the posts has a plurality of annular ridges formed on an exterior surface of the post.

3. The system of claim 2 wherein each of the posts is substantially solid.

4. The system of claim 2 wherein the eyeglasses frame lies generally in a plant and each of the posts being oriented substantially perpendicular to the plane of the eyeglasses frame.

5. The system of claim 2 wherein each of the cavities comprises a bore.

6. The system of claim 5 wherein each of the opposite ends includes an end piece having the bore formed therein, the end piece being formed of a flexible material.

7. The system of claim 5 wherein each of the bores has a longitudinal axis extending substantially parallel to an extent of the lace structure connected to the end piece having the bore formed therein.

8. The system of claim 2 wherein each of the cavities comprises a bore;

wherein each of the bores has a cylindrical interior surface;

wherein each of the opposite ends includes an end piece having the bore formed therein, the end piece being formed of a flexible material; and wherein each of the bores has a longitudinal axis extending substantially parallel to an extent of the lace structure connected to the end piece having the bore formed therein.

9. The system of claim 2 wherein the plurality of annular ridges on each post forms threads.

* * * * *